United States Patent
Qian et al.

(10) Patent No.: US 12,136,972 B2
(45) Date of Patent: Nov. 5, 2024

(54) WIRELESS COMMUNICATION SYSTEM, AND DEVICE AND METHOD IN WIRELESS COMMUNICATION SYSTEM

(71) Applicant: Sony Group Corporation, Tokyo (JP)

(72) Inventors: Chen Qian, Beijing (CN); Zhaocheng Wang, Beijing (CN); Wendong Liu, Beijing (CN); Jinhui Chen, Beijing (CN)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 18/199,386

(22) Filed: May 19, 2023

(65) Prior Publication Data

US 2023/0291445 A1    Sep. 14, 2023

Related U.S. Application Data

(63) Continuation of application No. 17/066,497, filed on Oct. 9, 2020, now Pat. No. 11,689,255, which is a
(Continued)

(30) Foreign Application Priority Data

May 15, 2015    (CN) .......................... 201510250263.2

(51) Int. Cl.
*H04B 7/0456*   (2017.01)
*H04B 7/04*   (2017.01)
(Continued)

(52) U.S. Cl.
CPC ............. *H04B 7/0456* (2013.01); *H04B 7/04* (2013.01); *H04B 7/06* (2013.01); *H04B 7/0626* (2013.01); *H04W 16/28* (2013.01); *H04B 7/024* (2013.01)

(58) Field of Classification Search
CPC .......... H04B 7/0456; H04B 7/04; H04B 7/06; H04B 7/0626; H04W 16/28
(Continued)

(56) References Cited

U.S. PATENT DOCUMENTS 9,014,288 B2    4/2015   Chen et al.
9,780,860 B1   10/2017   Sung et al.
(Continued)

FOREIGN PATENT DOCUMENTS

AU    2013306572 A1    10/2014
CN     101902312 A     12/2010
(Continued)

OTHER PUBLICATIONS

Extended European Search Report for European Application No. 16795831.3, mailed on Dec. 7, 2018.
(Continued)

*Primary Examiner* — Leila Malek
(74) *Attorney, Agent, or Firm* — XSENSUS LLP

(57) ABSTRACT

Disclosed are a device and method in a wireless communication system. The device comprises: a first generating unit configured to generate a first pre-coding matrix according to first channel information on a channel between a first communication apparatus and a second communication apparatus; a second generating unit configured to generate a second pre-coding matrix according to the first pre-coding matrix and second channel information on the channel; and a pre-coding unit configured to pre-code a data signal according to the first pre-coding matrix and the second pre-coding matrix. According to the embodiments of the present invention, interference between user equipment can be effectively removed, the operation complexity is reduced, and the whole performance of the system is optimized.

22 Claims, 20 Drawing Sheets

Related U.S. Application Data continuation of application No. 16/556,604, filed on Aug. 30, 2019, now Pat. No. 10,840,980, which is a continuation of application No. 15/572,558, filed as application No. PCT/CN2016/081848 on May 12, 2016, now Pat. No. 10,447,355.

(51) Int. Cl.
*H04B 7/06* (2006.01)
*H04W 16/28* (2009.01)
*H04B 7/024* (2017.01)

(58) Field of Classification Search
USPC .......................................................... 375/267
See application file for complete search history.

(56) References Cited

U.S. PATENT DOCUMENTS

| | | |
|---|---|---|
| 10,390,246 B2 | 8/2019 | Liu |
| 2010/0246457 A1 | 9/2010 | Zhou et al. |
| 2013/0182594 A1 | 7/2013 | Kim et al. |
| 2013/0202057 A1 | 8/2013 | Chen et al. |
| 2013/0315081 A1 | 11/2013 | Kim et al. |
| 2013/0322288 A1 | 12/2013 | Zhang |
| 2014/0079149 A1 | 3/2014 | Lee et al. |
| 2014/0177683 A1 | 6/2014 | Krishnamurthy et al. |
| 2014/0177745 A1 | 6/2014 | Krishnamurthy et al. |
| 2015/0030006 A1 | 1/2015 | Fujio et al. |
| 2015/0124736 A1 | 5/2015 | Ko |
| 2015/0349864 A1 | 12/2015 | Kim et al. |
| 2016/0021551 A1 | 1/2016 | Park |
| 2016/0028519 A1 | 1/2016 | Wei |
| 2016/0233938 A1 | 8/2016 | Mondal et al. |

FOREIGN PATENT DOCUMENTS

| | | | | |
|---|---|---|---|---|
| CN | 102379098 | * | 3/2012 | |
| CN | 102379098 A | | 3/2012 | |
| CN | 104283631 A | | 1/2015 | |
| EP | 2817893 A1 | * | 12/2014 | ........... H04B 17/345 |
| EP | 2817893 B1 | | 4/2021 | |
| WO | 2012/110863 A1 | | 8/2012 | |
| WO | 2013/019031 A2 | | 2/2013 | |
| WO | 2014/117352 A1 | | 8/2014 | |
| WO | WO-2014117748 A1 | | 8/2014 | |
| WO | WO-2014157824 A1 | | 10/2014 | |
| WO | 2015/054895 A1 | | 4/2015 | |

OTHER PUBLICATIONS

"Discussion on Feedback Scheme for Reduced Dimension Channel", 3GPP TSG RAN WG1 Meeting #80bis, Agenda item 7.2.5.2.1, R1-152157, Belgrade, Serbia, Apr. 20-24, 2015.
Japanese Notification of Reasons for Refusal issued Aug. 7, 2018 in Japanese Patent Application No. 2017-542456.
International Search Report issued Aug. 3, 2016 in PCT/CN2016/081848 filed May 12, 2016.
Fujitsu, "Discussion on possible CSI-RS and SRS enhancement for EBF/FD-MIMO", R1-151568, 3GPP TSG RAN WG1 #80bis, 3GPP, Apr. 10, 2015.
LG Electronics, "Hybrid beamformed and non-precoded CSI-RS based schemes", R1-151535, 3GPP TSG RAN WG1 #80bis, Apr. 11, 2015.

\* cited by examiner

WIRELESS COMMUNICATION SYSTEM, AND DEVICE AND METHOD IN WIRELESS COMMUNICATION SYSTEM

CROSS-REFERENCE TO RELATED APPLICATIONS

The present application is a continuation of U.S. application Ser. No. 17/066,497, filed Oct. 9, 2020, which is a continuation of U.S. application Ser. No. 16/556,604, filed Aug. 30, 2019 (now U.S. Pat. No. 10,840,980), which is a continuation of U.S. application Ser. No. 15/572,558, filed Nov. 8, 2017 (now U.S. Pat. No. 10,447,355), which is based on PCT filing PCT/CN2016/081848, filed May 12, 2016, and claims priority to CN 201510250263.2, filed May 15, 2015, the entire contents of each are incorporated herein by reference.

FIELD

The present disclosure relates to the field of wireless communication technology, and in particular to a wireless communication system and a device and a method in the wireless communication system, which implement a two-stage channel estimation and feedback scheme and a two-step pre-coding scheme that are adapted to an antenna array.

BACKGROUND

A massive Multi-input Multi-output (MIMO) system attracts wide attention from the academia and the industry in recent years. The theoretical study shows that the massive MIMO system can significantly improve spectrum efficiency and energy efficiency of the system with simple linear detection and pre-coding algorithms, for example Zero Forcing (ZF) algorithm, Minimum Mean Square Error (MMSE) algorithm and the like, thus the massive MIMO is likely to be adopted as key technology for a next generation communication standard.

In an actual system, there are a series of problems to be solved in the massive MIMO technology. In theoretical study of the massive MIMO, generally it is assumed that a base station adopts a linear array with a uniform spacing, i.e., antennas are placed in only a horizontal direction. In a case that the number of antennas is great, the linear array will result in that an antenna scale of the base station is too large and is difficult to be realized. One of solutions to the problem is to adopt a 3D-MIMO system in which antennas are placed in both a horizontal direction and a vertical direction. For the 3D-MIMO system, degrees of freedom (related to the number of antennas in the horizontal direction and the vertical direction) in both the horizontal direction and the vertical direction can be utilized, thereby reducing the scale of the antenna array effectively. In addition, an extra degree of freedom in the vertical direction can be used to weaken interference between users and reduce interference between cells and so on, and hence the system performance can be improved to a certain degree. Due to these advantages, the 3D-MIMO technology attracts attention from the industry, and is likely to be incorporated into the existing wireless communication standard.

Since the user equipment has limited feedback accuracy, accurate channel status information can not be obtained using the existing channel estimation and feedback schemes, and the system performance can not be improved effectively.

SUMMARY

A brief summary of the disclosure will be given below to provide basic understanding of some aspects of the disclosure. However, it shall be appreciated that this summary is neither exhaustively descriptive of the disclosure nor intended to define essential or important components or the scope of the disclosure but is merely for the purpose of presenting some concepts of the disclosure in a simplified form and hereby acts as a preamble of more detailed descriptions which will be presented later.

In view of the above problems, an object of the present disclosure is to provide a wireless communication system and a device and a method in the wireless communication system, which implement a two-stage channel estimation and feedback scheme and a corresponding pre-coding scheme, which are adapted to an antenna array, improve the system performance and reduce operation complexity.

According to an aspect of the present disclosure, a device in a wireless communication system is provided, which includes: a first generating unit configured to generate a first pre-coding matrix according to first channel information on a channel between a first communication apparatus and a second communication apparatus; and a second generating unit configured to generate a second pre-coding matrix according to the first pre-coding matrix and second channel information on the channel; and a pre-coding unit configured to pre-code a data signal according to the first pre-coding matrix and the second pre-coding matrix.

According to another aspect of the present disclosure, a method in a wireless communication system is further provided, which includes: a first generating step of generating a first pre-coding matrix according to first channel information on a channel between a first communication apparatus and a second communication apparatus; a second generating step of generating a second pre-coding matrix according to the first pre-coding matrix and second channel information on the channel; and a pre-coding step of pre-coding a data signal according to the first pre-coding matrix and the second pre-coding matrix.

According to an aspect of the present disclosure, a device in a wireless communication system is further provided, which includes circuitry configured to: report first channel information on a channel between a first communication apparatus and a second communication apparatus for the first communication apparatus generating a first pre-coding matrix according to the first channel information; report second channel information on the channel for the first communication apparatus generating a second pre-coding matrix according to the first pre-coding matrix and the second channel information; and acquire a data signal pre-coded by the first communication apparatus according to the first pre-coding matrix and the second pre-coding matrix.

According to another aspect of the present disclosure, a method in a wireless communication system is further provided, which includes: reporting first channel information on a channel between a first communication apparatus and a second communication apparatus for the first communication apparatus generating a first pre-coding matrix according to the first channel information; reporting second channel information on the channel for the first communication apparatus generating a second pre-coding matrix according to the first pre-coding matrix and the second channel information; and acquiring a data signal precoded by the first communication apparatus according to the first pre-coding matrix and the second pre-coding matrix.

According to another aspect of the present disclosure, a device in a wireless communication system is further provided, which includes: a channel information acquiring unit configured to acquire first channel information on a channel between a first communication apparatus and a second communication apparatus; a pre-coding unit configured to pre-code a first reference signal based on the first channel information; a measurement configuration information generating unit configured to generate measurement configuration information for the second communication apparatus, the measurement configuration information including a measurement indication for the pre-coded first reference signal; and a controlling unit configured to control data signal transmission based on second channel information, which is fed back for the pre-coded first reference signal by the second communication apparatus according to the measurement configuration information.

According to a preferred embodiment of the present disclosure, the pre-coding unit may be further configured to pre-code the first reference signal further based on channel information related to other communication apparatus.

According to a preferred embodiment of the present disclosure, the controlling unit may be further configured to control the data signal transmission further based on channel information related to other communication apparatus.

According to a preferred embodiment of the present disclosure, the channel information acquiring unit may be configured to acquire the first channel information of multiple second communication apparatuses, and the device may further include: a determining unit configured to determine, based on the first channel information of each of the multiple second communication apparatuses, whether the first communication apparatus is to send the pre-coded first reference signal to a corresponding second communication apparatus. Preferably, the pre-coding unit may be further configured to pre-code, based on a determination result of the determining unit, the first reference signal for the first channel information of one or more of the multiple second communication apparatuses.

According to a preferred embodiment of the present disclosure, the pre-coding unit may be configured to calculate, for the first channel information of one or more of the multiple second communication apparatuses, pre-coding matrixes of corresponding second communication apparatuses, and pre-code the first reference signal utilizing superposition of the pre-coding matrixes.

According to a preferred embodiment of the present disclosure, the pre-coding unit may be configured to calculate, for the first channel information of one or more of the multiple second communication apparatus, pre-coding matrixes of corresponding second communication apparatuses, and pre-code the first reference signal utilizing the pre-coding matrixes respectively. Preferably, the device may be configured to allocate different code words, time or frequency resources to the first reference signal for one or more of the multiple second communication apparatuses so as to perform multiplexing.

According to a preferred embodiment of the present disclosure, the device may further include: a radio resource allocating unit configure to allocate, based on the first channel information, radio resources for transmission of the pre-coded first reference signal or a data signal.

According to a preferred embodiment of the present disclosure, the channel information acquiring unit may be further configured to acquire feedback information for a second reference signal of the second communication apparatus as the first channel information.

According to a preferred embodiment of the present disclosure, the second reference signal may be transmitted on only a part of antennas in an antenna array of the first communication apparatus.

According to a preferred embodiment of the present disclosure, the device may further include: a beamforming unit configured to perform static/semi-static beamforming on the second reference signal. Preferably, the channel information acquiring unit may be further configured to acquire feedback information for the beamformed second reference signal of the second communication apparatus as the first channel information.

According to a preferred embodiment of the present disclosure, the first reference signal may be a narrowband signal, and the second reference signal may be a wideband signal.

According to a preferred embodiment of the present disclosure, a transmission cycle of the first reference signal may be shorter than that of the second reference signal.

According to a preferred embodiment of the present disclosure, the channel information acquiring unit may be further configured to acquire the first channel information by performing channel estimation according to a third reference signal from the second communication apparatus.

According to a preferred embodiment of the present disclosure, the third reference signal may be an uplink sounding reference signal.

According to a preferred embodiment of the present disclosure, the first communication apparatus may be a base station, the second communication apparatus may be user equipment, the device may be located at the base station end, and the device may further include: a transceiving unit configured to perform signal transceiving between the base station and the user equipment.

According to a preferred embodiment of the present disclosure, the first channel information may be channel information in a first dimensional direction, and the second channel information may be channel information in a second dimensional direction.

According to a preferred embodiment of the present disclosure, the first dimensional direction may be an altitude direction, and the second dimensional direction may be an angular direction.

According to a preferred embodiment of the present disclosure, the first dimensional direction may be an angular direction, and the second dimensional direction may be an altitude direction.

According to a preferred embodiment of the present disclosure, the first channel information may be preliminary information on the channel, and the second channel information may be further information on the channel.

According to another aspect of the present disclosure, a device in a wireless communication system is further provided, which includes: a measuring unit configured to measure, based on measurement configuration information for a second communication apparatus from a first communication apparatus, a pre-coded first reference signal from the first communication apparatus, the measurement configuration information including a measurement indication for the pre-coded first reference signal; and a feedback information generating unit configured to generate, based on measurement for the pre-coded first reference signal, feedback information as second channel information on a channel between the first communication apparatus and the second communication apparatus, for the first communication apparatus to control data signal transmission.

According to another aspect of the present disclosure, a wireless communication system is further provided, which includes: a first communication apparatus configured to acquire first channel information on a channel between the first communication apparatus and a second communication apparatus, pre-code a first reference signal based on the first channel information, generate measurement configuration information for the second communication apparatus, the measurement configuration information including a measurement indication for the pre-coded first reference signal, and control data signal transmission based on second channel information, which is fed back for the pre-coded first reference signal by the second communication apparatus according to the measurement configuration information; and the second communication apparatus configured to: measure the pre-coded first reference signal based on the measurement configuration information, and generate feedback information based on measurement for the pre-coded first reference signal as the second channel information.

According to another aspect of the present disclosure, a method in a wireless communication system is further provided, which includes: a channel information acquiring step of acquiring first channel information on a channel between a first communication apparatus and a second communication apparatus; a pre-coding step of pre-coding a first reference signal based on the first channel information; a measurement configuration information generating step of generating measurement configuration information for the second communication apparatus, the measurement configuration information including a measurement indication for the pre-coded first reference signal; and a controlling step of controlling data signal transmission based on second channel information, which is fed back for the pre-coded first reference signal by the second communication apparatus according to the measurement configuration information.

According to another aspect of the present disclosure, a method in a wireless communication system is further provided, which includes: a measuring step of measuring, based on measurement configuration information for a second communication apparatus from a first communication apparatus, a pre-coded first reference signal from the first communication apparatus, the measurement configuration information including a measurement indication for the pre-coded first reference signal; and a feedback information generating step of generating, based on measurement for the pre-coded first reference signal, feedback information as second channel information on a channel between the first communication apparatus and the second communication apparatus, for the first communication apparatus to control data signal transmission.

According to another aspect of the present disclosure, an electronic apparatus is further provided, which includes one or more processors configured to perform the methods in the wireless communication system according to the present disclosure described above.

According to other aspects of the present disclosure, computer program codes and a computer program product for implementing the methods of the present disclosure, and a computer readable storage medium, on which the computer program codes for implementing the methods of the present disclosure are recorded, are further provided.

According to embodiments of the present disclosure, in a wireless communication system installed with a massive antenna array, for example a massive 3D-MIMO system, by utilizing a two-stage channel estimation and feedback scheme and a corresponding pre-coding scheme, it is possible to effectively eliminate interference, reduce operation complexity and improve system overall performance.

Other aspects of embodiments of the present disclosure are given in the following parts of the description. In which, detailed illustration is used to sufficiently disclose preferred embodiments of the embodiments of the present disclosure rather than limit the present disclosure.

BRIEF DESCRIPTION OF THE DRAWINGS

The disclosure can be better understood with reference to the detailed description given below in conjunction with the accompanying drawings, throughout which identical or like reference signs denote identical or like components. The accompanying drawings together with the following detailed description are incorporated into and form a part of the specification and serve to further illustrate the preferred embodiments of the disclosure and to explain the principle and advantages of the disclosure by way of example. In the drawings.

DETAILED DESCRIPTION OF THE EMBODIMENTS

Figure 1:
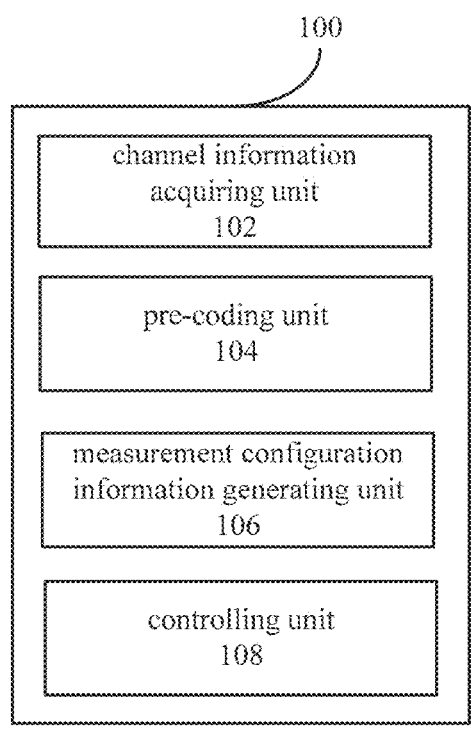
FIG. 1 shows a block diagram of a functional configuration example of a device in a wireless communication system according to an embodiment of the present disclosure.

Exemplary embodiments of the present disclosure will be described below in conjunction with the accompanying drawings. For the sake of clarity and conciseness, not all the features of practical implementations are described in the specification. However, it is to be appreciated that numerous implementation-specific decisions shall be made during developing any of such practical implementations so as to achieve the developer's specific goals, for example, to comply with system- and business-related constraining conditions which will vary from one implementation to another. Moreover, it shall also be appreciated that such a development effort might be very complex and time-consuming but may simply be a routine task for those skilled in the art benefiting from this disclosure.

It shall further be noted that only those device structures and/or process steps closely relevant to the solutions of the disclosure are illustrated in the drawings while other details less relevant to the disclosure are omitted so as not to obscure the disclosure due to those unnecessary details.

Hereinafter embodiments of the present disclosure are described in detail in conjunction with FIG. 1 to FIG. 24.

Before describing the embodiments of the present disclosure, a method for performing channel estimation and sending a reference signal in a 3D-MIMO system according to the conventional technology is introduced briefly.

Presently, in the 3D-MIMO system, a reference signal may be sent generally in the following two methods. A first method is full space channel pre-coding. This method does not need extra processing, and each physical antenna port corresponds to a reference signal for channel estimation. A disadvantage of the first method is that a large reference signal overhead may be caused. A second method is a method for sending a reference signal based on a Kronecker product. Specifically, a group of horizontal antennas are selected to send a reference signal to obtain horizontal channel information, then another group of vertical antennas are selected to send a reference signal to obtain vertical channel information, and then orthogonal processing is performed on the horizontal channel information and the vertical channel information. A disadvantage of the second method is that: a receiving level of user equipment is low since the reference signal is sent in an omni-directional way, thereby resulting in a low accuracy of channel estimation.

In the technology of the present disclosure, it is considered to combine channel feedback information of multiple users and utilize a two-stage channel estimation and feedback scheme, to effectively increase a receiving level for a reference signal at user equipment end, thereby obtaining more accurate channel status information and improving the system performance.

Hereinafter a block diagram of a functional configuration example of a device at base station end in a wireless communication system according to an embodiment of the present disclosure will be described by referring to FIG. 1 first.

As shown in FIG. 1, a device 100 according to the example may include a channel information acquiring unit 102, a pre-coding unit 104, a measurement configuration information generating unit 106 and a controlling unit 108. Hereinafter functional configuration examples of respective units are described in detail respectively. In some embodiments, the respective units described above may be implemented by one or more processors, without providing separated components.

The channel information acquiring unit 102 may be configured to acquire first channel information on a channel between a first communication apparatus and a second communication apparatus.

Preferably, the first communication apparatus may be a base station, and the second communication apparatus may be user equipment. Here, it should be noted that in the embodiment of the present disclosure, description is made by assuming that the first communication apparatus is a base station and the second communication apparatus is user equipment, but the present disclosure is not limited thereto. Alternatively, the first communication apparatus may be other infrastructures or user equipment having a corresponding base station function, and the second communication apparatus may be a small base station or other infrastructures having a corresponding user equipment function. An object of the present disclosure is to determine a channel condition between communication apparatuses and thus perform processing such as appropriate pre-coding, resource scheduling and so on, so as to achieve efficient data communication between the communication apparatuses.

Hereinafter two exemplary ways of acquiring first channel information by the channel information acquiring unit 102 are described respectively.

In one exemplary way, in a Frequency Division Duplexing (FDD) system, the channel information acquiring unit 102 may be configured to acquire feedback information for a second reference signal of the second communication apparatus as first channel information.

Specifically, for example, the first communication apparatus (for example, a base station) may send a second reference signal (for example, a Channel Status Indicator-Reference Signal (CSI-RS), a Cell-Specific Reference Signal (CRS) or the like) to the second communication apparatus (for example user equipment), and thus the user equipment may measure the second reference signal according to corresponding measurement configuration information (which may include a measurement indication for the second reference signal) and feed back a measurement result to the base station using for example a channel quality indication (CQI), a pre-coding matrix indication (PMI), a rank indication (RI) or the like, as the first channel information reflecting a channel condition. An example in this case is described later by referring to a schematic diagram of an interaction flow shown in FIG. 8.

As an example, the second reference signal may be a reference signal (for example CSI-RS, CRS or the like) in an altitude direction (for example, a vertical direction), which is adapted to a case where the number of user clusters in an angular direction (for example, a horizontal direction) is small, thereby increasing a receiving power for the reference signal of the user in the angular direction; in addition, in this case, the acquired first channel information is channel information in the vertical direction for example. However, it should be understood that, according to an actual distribution of the antenna array and the communication apparatuses and an actual performance requirement, the second reference signal may also be a reference signal in the angular direction (for example, a horizontal direction), which is adapted to a case where the number of user clusters in the altitude direction is small, thereby increasing a receiving power for the reference signal of the user in the altitude direction, which also applies to the technology described in the present disclosure.

Preferably, considering correlation between positions of antenna elements, the second reference signal may be transmitted on only a part of antennas (for example, a certain group of antennas) in an antenna array of the first communication apparatus (for example, a base station), instead of being transmitted on all antenna elements, since in a case that a spacing between antenna elements is small, there is strong correlation between channel coefficient vectors corresponding to different groups on the antenna array, effective information for pre-coding can be obtained by estimating a channel coefficient corresponding to only one group of antennas. For example, the base station may obtain, by sending CSI-RS utilizing a column of antennas in the vertical direction, an estimation result for the channel status in the vertical direction from the user equipment. In this way, resource requirement for the reference signal may be reduced.

As another example, the second reference signal may be not limited to a reference signal in a certain fixed direction. In this case, preferably, the second reference signal may be beamformed. Hence, in the example, the device 100 may further include a beamforming unit configured to perform a static/semi-static beamforming on the second reference signal, which is different from a pre-coding process based on a code book. The channel information acquiring unit 102 may be further configured to acquire feedback information for the beamformed second reference signal of the second communication apparatus (for example, user equipment) as the first channel information. It should be understood that, in this case, the acquired first channel information may be preliminary estimation information on the channel, for example, a rough channel direction of the user equipment is obtained. It should be understood that, in a case of beamforming the second reference signal, the beamforming may be performed within a relatively wide range (i.e., covering more user equipment) to obtain preliminary information on the channel.

As another example, the second reference signal may cover a downlink bandwidth and have a relatively long transmission cycle. Specifically, the second reference signal may be distributed uniformly or approximately uniformly on the whole bandwidth and cover the whole bandwidth. Accordingly, the user equipment feeds back long-term/wideband channel status information for the second reference signal as preliminary first channel information, for the base station to process the first reference signal covering a narrowband downlink bandwidth, thereby acquiring more accurate second channel information.

As another exemplary way, in a Time Division Duplexing (TDD) system, the channel information acquiring unit 102 may be further configured to perform channel estimation according to a third reference signal from the second communication apparatus, so as to acquire the first channel information. Preferably, as an example, the third reference signal may be an uplink Sounding Reference Signal (SRS).

Specifically, for example, the second communication apparatus (for example, user equipment) may send the third reference signal (for example, an uplink SRS) to the first communication apparatus (for example, a base station), and thus the base station may perform channel estimation according to the third reference signal to obtain the first channel information on the channel. A specific channel estimation method is the same as the method in the conventional technology, which is not described in detail here. An example in this case is described in detail later by referring to a schematic diagram of an interaction flow shown in FIG. 9.

In summary, in an example in which the first communication apparatus is a base station and the second communication apparatus is user equipment, the base station may send a downlink reference signal which is not pre-coded, and then acquire a channel status information report obtained by measuring the downlink reference signal by the user equipment, to determine preliminary downlink channel status information. Alternatively, based on reciprocity between uplink/downlink channels, the base station estimates preliminary downlink channel status information by receiving the uplink reference signal from the user equipment.

The pre-coding unit 104 may be configured to pre-code the first reference signal based on the first channel information. For example, pre-coding is performed such that the first reference signal is transmitted in a certain direction or on a certain beam. Preferably, the pre-coding method may be pre-coding not based on a code book, for example ZF pre-coding, and MMSE pre-coding, to enhance a receiving level for the first reference signal of the user equipment. Alternatively, the pre-coding method may also be pre-coding based on a code book.

In a case that the first channel information is channel information in an altitude direction (for example a vertical direction), the first reference signal may be a reference signal (for example a CSI-RS, CRS or the like) in an angular direction (for example, a horizontal direction), and the pre-coding process may be pre-coding in a vertical direction, aiming to improve a receiving level for the reference signal in the horizontal direction of user equipment at different altitudes. As compared with the second reference signal, the first reference signal may be transmitted on all antenna elements.

It should be noted that, the first reference signal and the second reference signal are not limited to reference signals in the angular direction and the altitude direction, and may be reference signals in any direction based on actual cases. In this case, the pre-coding processing may be adapted to improve a receiving level for the reference signal of user equipment in a corresponding direction.

Alternatively, corresponding to the above description, in a case that the second reference signal is a wideband/long-term signal, the first reference signal may be transmitted on one or several narrowbands (for example subbands) and have a relatively short transmission cycle. Specifically, the first reference signal may be distributed on one or more narrowbands (for example subbands) and does not cover the whole bandwidth. Accordingly, the user equipment performs a short-term/narrowband (subband) feedback for the first reference signal to acquire further information on the channel.

Preferably, the pre-coding unit 104 may be further configured to pre-code the first reference signal based on channel information related to other communication apparatus. Specifically, in addition to the first channel information related to current user equipment, the pre-coding unit 104 may pre-code a first reference signal for the current user equipment further based on channel information related to other communication apparatus (for example, the channel feedback information related to other user equipment obtained by the two exemplary ways described above). By considering channel information fed back by multiple user equipment in combination, it is possible to further effectively increase the receiving level for the first reference signal of the user equipment, improve the feedback accuracy, and simplify complexity of the pre-coding operation at base station end.

The measurement configuration information generating unit 106 may be configured to generate measurement configuration information for the second communication apparatus, where the measurement configuration information may include a measurement indication for the pre-coded first reference signal.

It should be understood that, in the above examples, when the base station sends the second reference signal to the user equipment, the base station also needs to send a measurement indication for the second reference signal to the user equipment. That is, the base station may indicate to the user equipment through signaling for example downlink control information (DCI) or the like, and thus the user equipment may measure a corresponding reference signal and perform corresponding measurement feedback in response to the indication. In addition, the base station may utilize for example an RRC signaling to carry measurement configuration information, for example, notify antenna port numbers for sending respective reference signals to the user equipment.

The controlling unit 108 may be configured to control data signal transmission based on second channel information, which is fed back for the pre-coded first reference signal by the second communication apparatus according to the measurement configuration information.

Specifically, for example, in response to the measurement configuration information, the second communication apparatus (for example, user equipment) may perform corresponding measurement and feed back a measurement result to the first communication apparatus (for example, a base station) through PMI, CQI and RI and so on as second channel information, and thus the base station may perform operations related to data signal transmission, for example, channel recovering, pre-coding, scheduling, modulation coding scheme setting and so on, according to the received second channel information.

As a preferred example, the controlling unit 108 may be further configured to control data signal transmission further based on channel information related to other communication apparatus. Specifically, the controlling unit 108 may control the operations related to data signal transmission, for example, user pair selection, resource allocation and so on in multiple user multiple input multiple output (MU-MIMO) processing, further based on the measurement result for the pre-coded first reference signal fed back from other communication apparatus (for example other user equipment), i.e., second channel information fed back by other user equipment, to the base station for example.

Preferably, corresponding to the first channel information, the second channel information may be channel information in an angular direction (for example a horizontal direction) or further information on the channel (i.e., more accurate information). For example, in a case that the second channel information is channel information in the horizontal direction, in subsequent operations, the controlling unit 108 may pre-code in the horizontal direction based on the second channel information. The pre-coding in the horizontal direction may be performed by adopting a pre-coding method which is not based on a code book (for example ZF pre-coding, MMSE pre-coding or the like), so as to further effectively increase a receiving level for the first reference signal of the user equipment, improve feedback accuracy and simplify complexity of a pre-coding operation at base station end. Alternatively, a pre-coding method based on a code book may also be adopted, and the code book may be a code book in the existing long term evolution-advanced (LTE-A) system.

As can be seen from the above description, according to the embodiment of the present disclosure, by performing pre-coding in the vertical direction, it is possible to sufficiently utilize a degree of freedom in the vertical direction, thereby effectively increasing the receiving level for the reference signal in the horizontal direction of the user equipment and reducing operation complexity. In addition, by performing a two-stage channel estimation and feedback (i.e., firstly obtaining preliminary information on the channel and then obtaining further information on the channel), relatively accurate information on the channel can be obtained, thereby optimizing the system performance.

Figure 2:
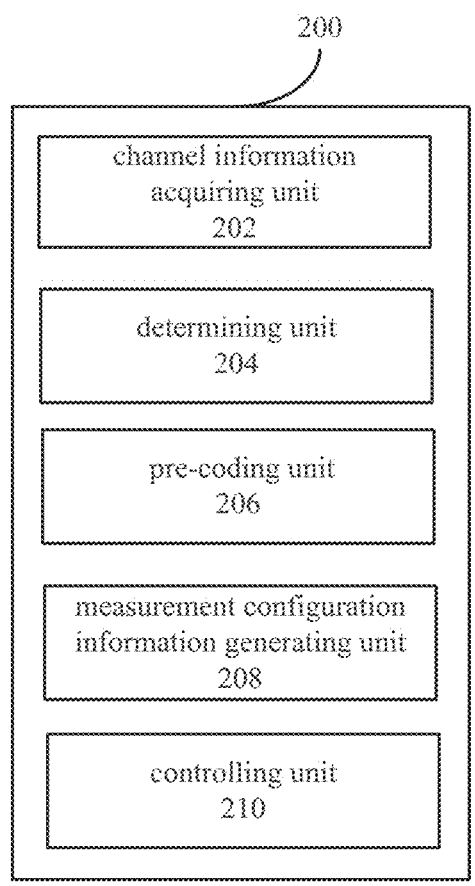
FIG. 2 shows a block diagram of another functional configuration example of a device in a wireless communication system according to an embodiment of the present disclosure.

Preferably, the pre-coding unit may select to consider channel information fed back by some rather than all of the user equipment on different radio resources, in performing the pre-coding operation. That is, if it does not need to consider channel information fed back by some of user equipment on the same radio resource, it is unnecessary to send the pre-coded first reference signal to these user equipment. Subsequently, an example in this case is described by referring to FIG. 2. FIG. 2 shows a block diagram of another functional configuration example of a device in a wireless communication system according to an embodiment of the present disclosure.

As shown in FIG. 2, a device 200 according to the example may include a channel information acquiring unit 202, a determining unit 204, a pre-coding unit 206, a measurement configuration information generating unit 208 and a controlling unit 210. Functional configuration examples of the channel information acquiring unit 202, the pre-coding unit 206, the measurement configuration information generating unit 208 and the controlling unit 210 are substantially the same as functional configuration examples of corresponding units described above by referring to FIG. 1, and are not repeated here. Hereinafter only a functional configuration example of the determining unit 204 is described in detail.

In the example, preferably, the channel information acquiring unit 202 may be configured to acquire first channel information of multiple second communication apparatuses respectively.

The determining unit 204 may be configured to determine, based on the first channel information of the multiple second communication apparatuses, whether a first communication apparatus is to send the pre-coded first reference signal to a corresponding second communication apparatus. In this way, based on a determination result of the determining unit 204, a base station may selectively send the pre-coded first reference signal to the user equipment. That is, according to the fed back channel information, the base station may select the user equipment to which the pre-coded first reference signal is to be sent. In this way, resource overhead for transmitting the reference signal can be reduced to a certain degree. Further, as a preferred example, the determining unit 204 may further determine, according to a specific optimization target, to which of the multiple second communication apparatuses the first communication apparatus is to send the pre-coded first reference signal.

Preferably, the pre-coding unit 206 may be further configured to pre-code, based on the determination result of the determining unit 204, the first reference signal for the first channel information of one or more of the multiple second communication apparatuses.

For example, if it is determined that a channel quality between some user equipment and the base station is poor according to the channel information fed back by the user equipment, the determining unit 204 determines that no MU-MIMO processing is performed on these user equipment subsequently and no further channel information is needed, and thus the pre-coding unit 206 may perform the pre-coding operation without considering these user equipment.

Specifically, as an example, the pre-coding unit 206 may calculate pre-coding matrixes of respective second communication apparatuses for the first channel information of one or more of the multiple second communication apparatuses, and pre-code the first reference signal utilizing superposition of the pre-coding matrixes. In the example, an overall pre-coding matrix is generated by utilizing the superposition of pre-coding matrixes of the selected second communication apparatuses, and a weighting processing is performed for a first reference signal to be sent on respective antennas by using the overall pre-coding matrix, so as to completely multiplex the same physical transmission resources, thereby achieving directional transmission in multiple directions.

Alternatively, as another example, the pre-coding unit 206 may calculate pre-coding matrixes of respective second communication apparatuses for the first channel information of one or more of the multiple second communication apparatuses, and pre-code the first reference signal by utilizing the pre-coding matrixes respectively. Preferably, the device 200 may allocate different code words, time or frequency resources to the first reference signal for one or more of the multiple second communication apparatuses to perform multiplexing. In the example, the device 200 sends the first reference signal to the selected second communication apparatuses in a manner of code division, time division or frequency division. In another example, the device 200 may select different, for example orthogonal, reference signal sequences for the selected second communication apparatuses to reduce interference.

Figure 3:
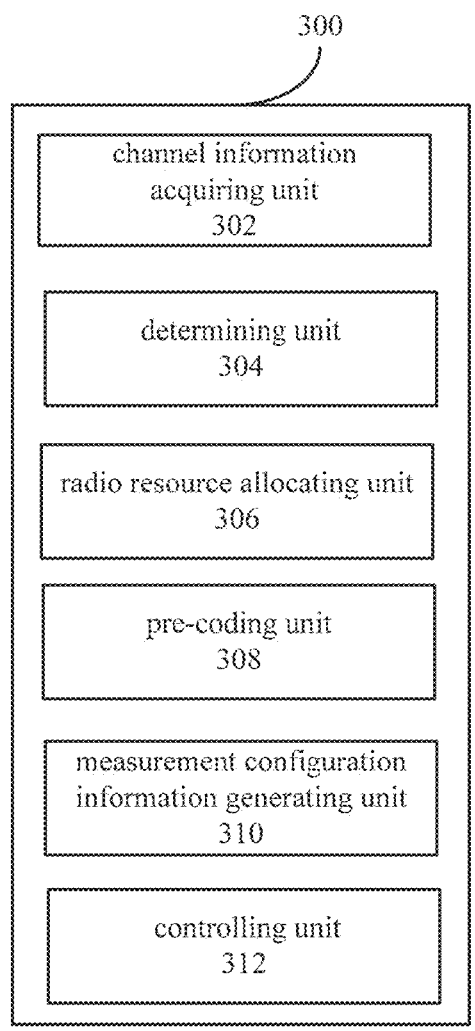
FIG. 3 shows a block diagram of another functional configuration example of a device in a wireless communication system according to an embodiment of the present disclosure.

Subsequently, another functional configuration example of a device in a wireless communication system according to an embodiment of the present disclosure is described by referring to FIG. 3. FIG. 3 shows a block diagram of another functional configuration example of a device in a wireless communication system according to an embodiment of the present disclosure.

As shown in FIG. 3, a device 300 according to the embodiment may include a channel information acquiring unit 302, a determining unit 304, a radio resource allocating unit 306, a pre-coding unit 308, a measurement configuration information generating unit 310 and a controlling unit 312. Functional configuration examples of the channel information acquiring unit 302, the determining unit 304, the pre-coding unit 308, the measurement configuration information generating unit 310 and the controlling unit 312 are substantially the same as functional configuration examples of corresponding units described above by referring to FIG. 2, and are not repeated here. Hereinafter only a functional configuration example of the radio resource allocating unit 306 is described in detail.

The radio resource allocating unit 306 may be configured to allocate radio resources for transmission of a pre-coded first reference signal and/or a data signal based on the first channel information.

Specifically, as a preferred example, according to a determination result of the determining unit 304, if the determining unit 304 determines that it does not need to send the pre-coded first reference signal to some user equipment, i.e., no further accurate channel information is needed for these user equipment, the radio resource allocating unit 306 may allocate resources for data communication to these user equipment based on the current first channel information.

In the embodiment of the present disclosure, instead of allocating radio resources based on the channel information finally fed back in the conventional technology, the radio resources are allocated to the user equipment based on information on the channel in a certain dimensional direction or preliminary information on the channel, thereby improving resource utilizing efficiency.

Figure 4:
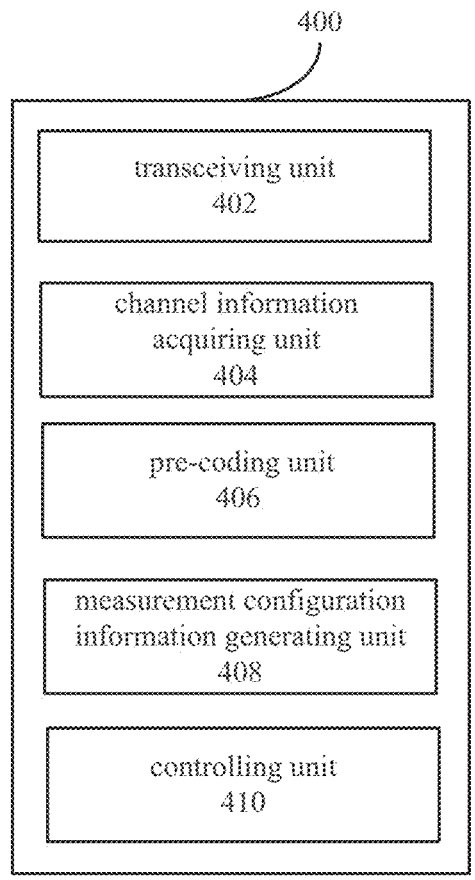
FIG. 4 shows a block diagram of another functional configuration example of a device in a wireless communication system according to an embodiment of the present disclosure.

As an example, the devices 100 to 300 according to the above embodiments may be located at base station end, and in this case, the device may further include a transceiving unit configured to perform communication with the user equipment. Subsequently, a functional configuration example of the device in this case is described by referring to FIG. 4. FIG. 4 shows a block diagram of another functional configuration example of a device in a wireless communication system according to an embodiment of the present disclosure.

As shown in FIG. 4, a device 400 according to the example may include a transceiving unit 402, a channel information acquiring unit 404, a pre-coding unit 406, a measurement configuration information generating unit 408 and a controlling unit 410. Functional configuration examples of the channel information acquiring unit 404, the pre-coding unit 406, the measurement configuration information generating unit 408 and the controlling unit 410 are substantially the same as functional configuration examples of corresponding units described above by referring to FIG.

1, and are not repeated here. Hereinafter only a functional configuration example of the transceiving unit 402 is described in detail.

The transceiving unit 402 may be configured to perform signal transceiving between a base station and user equipment. Specifically, for example, the transceiving unit 402 may be configured to send a second reference signal to the user equipment, receive first channel information fed back by the user equipment, send a pre-coded first reference signal and corresponding measurement configuration information to the user equipment, and receive second channel information fed back by the user equipment. In addition, the transceiving unit 402 may be also configured to receive a third reference signal from the user equipment for channel estimation. Further, the transceiving unit 402 may be further configured to receive channel feedback information from other user equipment.

Figure 5:
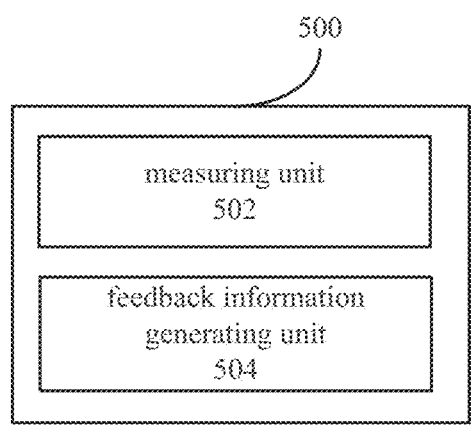
FIG. 5 shows a block diagram of a functional configuration example of a device in a wireless communication system according to another embodiment of the present disclosure.

FIG. 5 shows a block diagram of a functional configuration example of a device in a wireless communication system according to another embodiment of the present disclosure. The device may be located at user equipment end for example, but the present disclosure is not limited thereto. The device may also be located at a small base station or other infrastructure having the function of the user equipment.

As shown in FIG. 5, a device 500 according to the embodiment may include a measuring unit 502 and a feedback information generating unit 504. Subsequently functional configuration examples of respective units are described in detail.

The measuring unit 502 may be configured to measure a pre-coded first reference signal from a first communication apparatus based on measurement configuration information for a second communication apparatus from the first communication apparatus, where the measurement configuration information may include a measurement indication for the pre-coded first reference signal. As an example, the first communication apparatus may be a base station, and the second communication apparatus may be user equipment.

The feedback information generating unit 504 may be configured to generate, based on measurement for the pre-coded first reference signal, feedback information as second channel information on a channel between the first communication apparatus and the second communication apparatus, for the first communication apparatus to control data signal transmission. Specifically, after channel estimation according to the pre-coded first reference signal, the feedback information generating unit 504 may perform quantization according to a corresponding code book to generate the second channel information. The second channel information may be for example channel information in the angular direction or further information on the channel as described above. Specifically, as an example, corresponding to the description for the device at the base station end, the feedback information generating unit 504 may estimate a narrowband channel based on the pre-coded first reference signal and feed back narrowband (for example a subband) channel information.

Corresponding to the case in the FDD system described above, preferably, the measuring unit 502 may be further configured to measure a second reference signal from the first communication apparatus. The second reference signal may be a reference signal in an altitude direction for example, such that the base station obtains downlink channel status information in the altitude direction, thereby pre-coding a horizontal reference signal to increase a receiving level for the horizontal reference signal of the second communication apparatus and to preferentially eliminate interference in the altitude direction when the first communication apparatus performs pre-coding. It should be understood that, in this case, the measuring unit 502 also needs to measure the second reference signal according to corresponding measurement configuration information from the first communication apparatus, which includes the measurement indication for the second reference signal.

The feedback information generating unit 504 may be further configured to generate feedback information as first channel information on the channel based on measurement for the second reference signal, for use by the first communication apparatus. Specifically, after channel estimation based on the second reference signal, the feedback information generating unit 504 may perform quantization according to a corresponding code book to generate the first channel information, for the base station to for example perform pre-coding in the altitude direction, allocate radio resources to user equipment and so on, such that the receiving level for the horizontal reference signal of the second communication apparatus can be increased, and interference in the altitude direction can be preferentially eliminated when the first communication apparatus performs pre-coding, thereby improving resource utilizing efficiency. As an example, corresponding to the description of the device at the base station end, the feedback information generating unit 504 may estimate a wideband channel based on the second reference signal and feed back wideband channel information.

Preferably, a cycle at which the feedback information generating unit 504 performs channel estimation based on the pre-coded first reference signal and feeds back channel information is shorter than a cycle at which the feedback information generating unit 504 performs channel estimation based on a second reference signal and feeds back channel information.

It should be noted that, the feedback information generating unit 504 may adopt, in performing the quantization, different feedback code books for the pre-coded first reference signal and the second reference signal. For example, the user equipment measures the second reference signal which is not pre-coded to obtain preliminary channel status estimation, and may determine a first pre-coding matrix from a first code book and feed back PMI1 of 2 bits to the base station. The user equipment measures the pre-coded first reference signal to obtain further channel status estimation, and may determine a second pre-coding matrix from a second code book and feed back PMI2 of 2 bits to the base station. The base station may determine an accurate channel status by considering the PMI1, PMI2 (equivalent to an indication of 4 bits) and the corresponding code books in combination.

Figure 6:
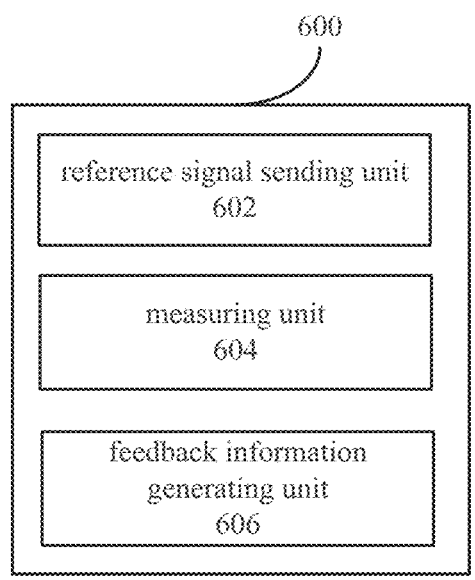
FIG. 6 shows a block diagram of another functional configuration example of a device in a wireless communication system according to another embodiment of the present disclosure.

Subsequently, a functional configuration example of a device at user equipment end corresponding to the above case in the TDD system is described by referring to FIG. 6. FIG. 6 shows a block diagram of another functional configuration example of a device in a wireless communication system according to another embodiment of the present disclosure.

As shown in FIG. 6, a device 600 according to the example may include a reference signal sending unit 602, a measuring unit 604 and a feedback information generating unit 606. Functional configuration examples of the measuring unit 604 and the feedback information generating unit 606 are substantially the same as functional configuration examples of corresponding units described above by referring to FIG. 5, and are not repeated here. Hereinafter only a functional configuration example of the reference signal sending unit 602 is described in detail.

The reference signal sending unit 602 may be configured to send a third reference signal to a first communication apparatus, for the first communication apparatus to perform channel estimation to obtain first channel information on a channel.

Specifically, as described above, the reference signal sending unit 602 may send for example an uplink SRS to the first communication apparatus (for example, a base station), The base station may perform channel estimation according to the received uplink SRS to obtain the first channel information, and then the base station may use the first channel information to for example perform pre-coding in a vertical direction, allocate radio resources and so on.

Figure 7:
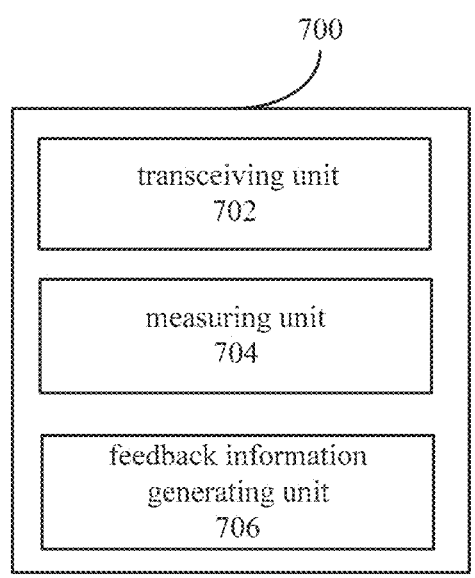
FIG. 7 shows a block diagram of another functional configuration example of a device in a wireless communication system according to another embodiment of the present disclosure.

As an example, the devices 500 and 600 according to the above embodiments may be located at the user equipment end, and in this case, the device may further include a transceiving unit configured to perform communication with the base station for example. Subsequently, a functional configuration example of the device in this case is described by referring to FIG. 7. FIG. 7 shows a block diagram of another functional configuration example of a device in a wireless communication system according to another embodiment of the present disclosure.

As shown in FIG. 7, a device 700 according to the example may include a transceiving unit 702, a measuring unit 704 and a feedback information generating unit 706. Functional configuration examples of the measuring unit 704 and the feedback information generating unit 706 are the same as functional configuration examples of corresponding units described above by referring to FIG. 5, and are not repeated here. Hereinafter only a functional configuration example of the transceiving unit 702 is described in detail.

The transceiving unit 702 may be configured to perform signal transceiving between user equipment and a base station. Specifically, for example, the transceiving unit 702 may be configured to receive a second reference signal and corresponding measurement configuration information from the base station, send a measurement result for the second reference signal to the base station as first channel information, receive a pre-coded first reference signal and corresponding measurement configuration information from the base station, and send a measurement result for the pre-coded first reference signal to the base station as second channel information. In addition, the transceiving unit 702 may be further configured to send a third reference signal to the base station, for the base station to perform channel estimation. In this case, the reference signal sending unit described by referring to FIG. 6 may be implemented by the transceiving unit 702. In addition, it should be understood that, the transceiving unit 702 may be also configured to perform signal transceiving between the user equipment and other external apparatuses.

Here, it should be noted that the device at the user equipment end described here corresponds to the device at the base station end described above, and hence the details not described in detail here may be referred to the above description, and are not repeated here.

In order to facilitate understanding of the above processes, hereinafter an interaction process regarding channel estimation and feedback between a first communication apparatus (for example, a base station) and a second communication apparatus (for example, user equipment) is described by referring to schematic flowcharts shown in FIG. 8 and FIG. 9.

Figure 8:
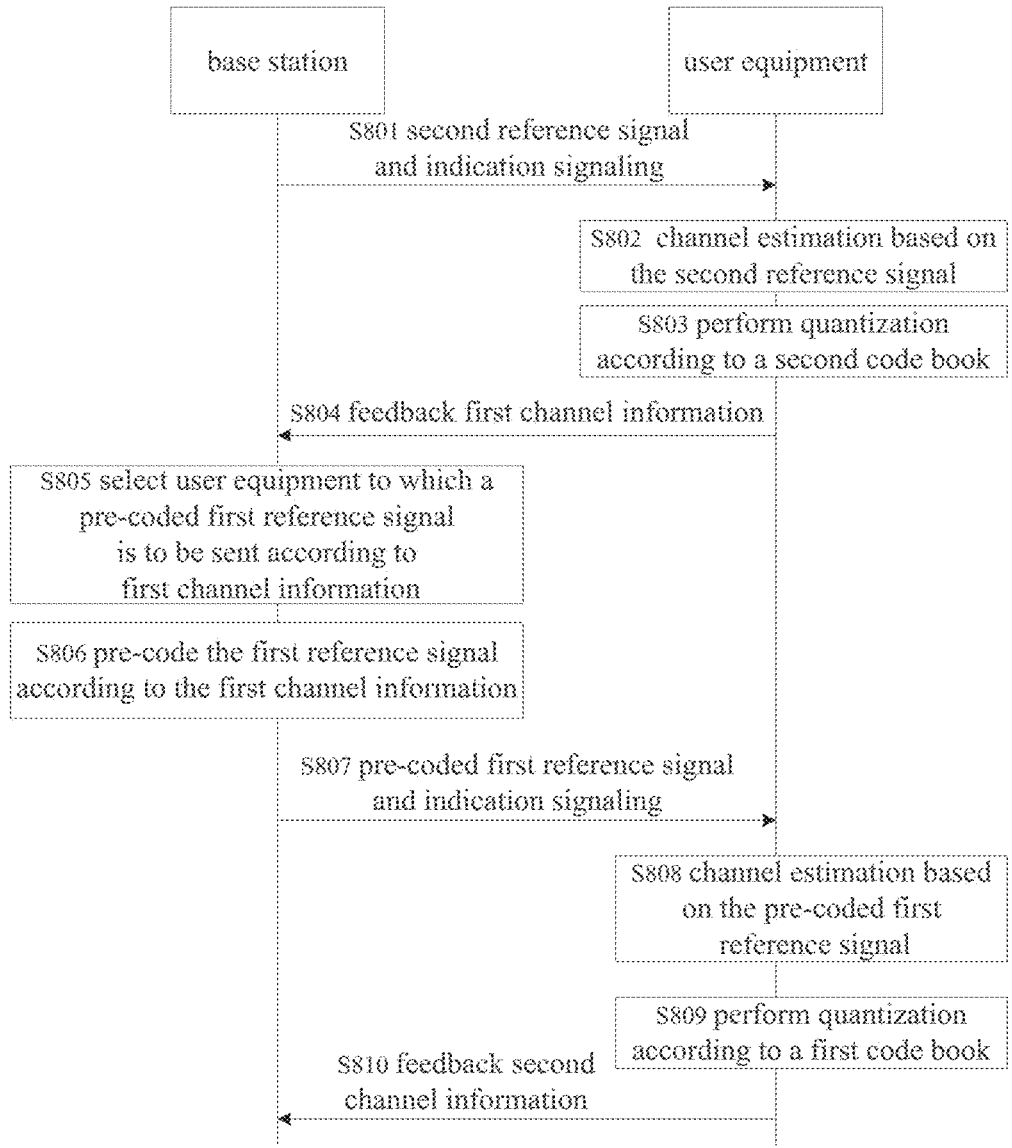
FIG. 8 shows a schematic diagram of an example of an interaction flow in a wireless communication system according to an embodiment of the present disclosure.

FIG. 8 shows a schematic diagram of an example of an interaction flow in a wireless communication system according to an embodiment of the present disclosure. The interaction flow corresponds to the case in the FDD system described above. Description is made here by taking the interaction between the base station and the user equipment as an example, but it should be understood that the present disclosure is not limited thereto.

As shown in FIG. 8, in step S801, the base station sends a second reference signal (for example a CSI-RS in a vertical direction) and corresponding measurement configuration information (which may include a measurement indication for the second reference signal) to the user equipment to estimate a physical channel in the vertical direction. In step S802, the user equipment performs channel estimation based on the second reference signal, and in step S803, the user equipment performs quantization according to a second code book. Subsequently, in step S804, the user equipment feeds back first channel information obtained by quantization to the base station. In step S805, the base station may select user equipment to which the pre-coded first reference signal is to be sent according to the first channel information, i.e., select user equipment the channel feedback information of which is to be considered in a subsequent pre-coding operation. In step S506, the base station pre-codes, in a manner of for example ZF pre-coding, MMSE pre-coding or the like, the first reference signal (for example CSI-RS in a horizontal direction) according to a selection result and in combination with the first channel information, to estimate an equivalent channel in a horizontal direction. The pre-coding in this case is pre-coding in a vertical direction, which may eliminate interference between different user equipment in the vertical direction for example, and the equivalent channel in the horizontal direction is used to describe an equivalent channel in the horizontal direction relative to a user after pre-coding in the vertical direction. Subsequently, in step S507, the base station sends the pre-coded first reference signal and corresponding measurement configuration information (which may include a measurement indication for the pre-coded first reference signal) to the user equipment. Subsequently, in step S508, the user equipment may perform channel estimation based on the pre-coded first reference signal, and in step S509, the user equipment performs quantization according to a first code book. It should be noted that, the first code book here is different from the second code book described above. Subsequently, in step S810, the user equipment feeds back second channel information obtained by quantization to the base station, for the base station to perform subsequent operations such as pre-coding, scheduling, modulation coding setting and so on.

It should be understood that, the interaction process described by referring to FIG. 8 is only an example, and those skilled in the art may make appropriate changes to the above interaction process according to principles of the present disclosure. For example, in step S801, before sending the second reference signal to the user equipment, the base station may perform static/semi-static beamforming on the second reference signal, so that the user equipment may feed back preliminary information on the channel as the first channel information. In addition, for example, in addition to receiving the first channel information and the second channel information fed back by the current user equipment, the base station may also receive the first channel information and the second channel information fed back by other user equipment to perform corresponding operations, thereby optimizing system performance.

Subsequently, another example of an interaction process according to an embodiment of the present disclosure is described by referring to FIG. 9. FIG. 9 shows a schematic diagram of another example of an interaction flow in a wireless communication system according to an embodiment of the present disclosure. The interaction process shown in FIG. 9 corresponds to the case in the TDD system described above.

Figure 9:
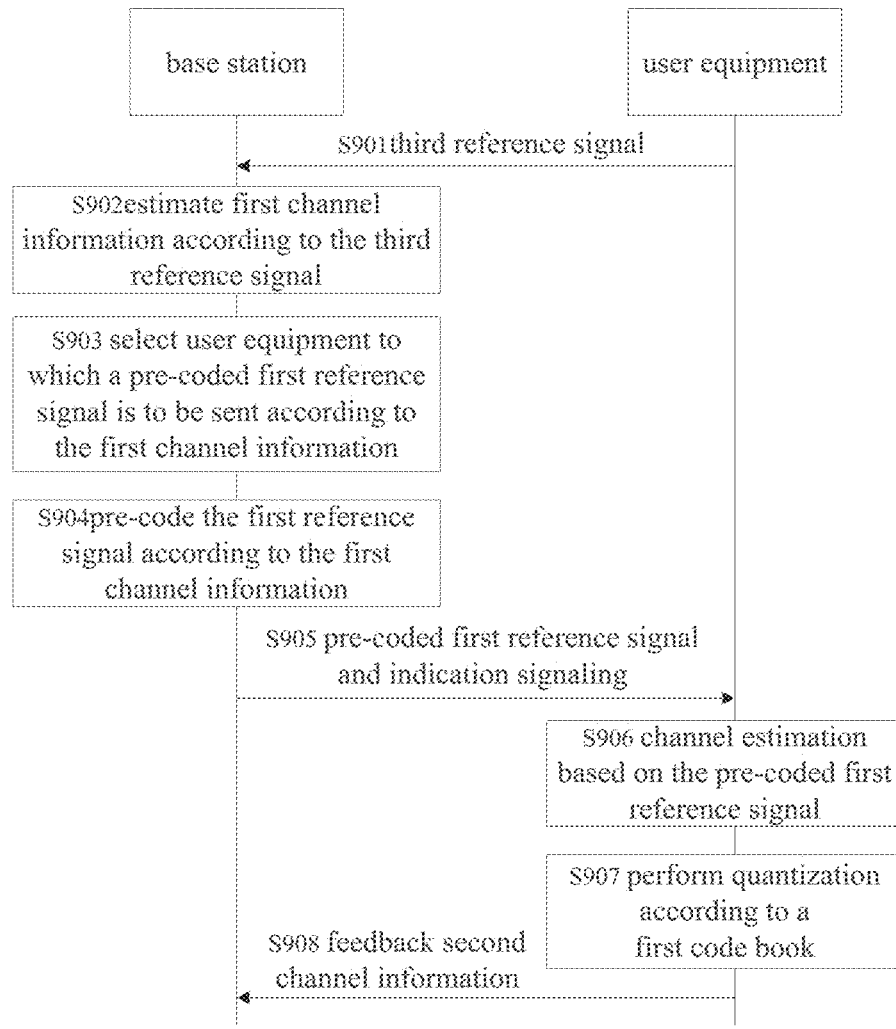
FIG. 9 shows a schematic diagram of another example of an interaction flow in a wireless communication system according to an embodiment of the present disclosure.

As can be seen, the interaction process shown in FIG. 9 is substantially the same as the interaction process shown in FIG. 8, except for the acquisition manner of the first channel information, hence only the acquisition of the first channel information in the interaction process is described in detail here.

As shown in FIG. 9, in step S901, the user equipment sends a third reference signal, for example an uplink SRS, to the base station. Subsequently, in step S902, the base station performs channel estimation according to the received third reference signal to obtain first channel information on the channel, and determines in subsequent step S903 whether to send the pre-coded first reference signal to the user equipment according to the first channel information. The processing in subsequent steps is substantially the same as the processing in corresponding steps described by referring to FIG. 8, and is not repeated here.

Subsequently, a two-stage pre-coding scheme for a data signal according to the technology in the present disclosure is described by referring to FIG. 10 to FIG. 13.

Figure 10:
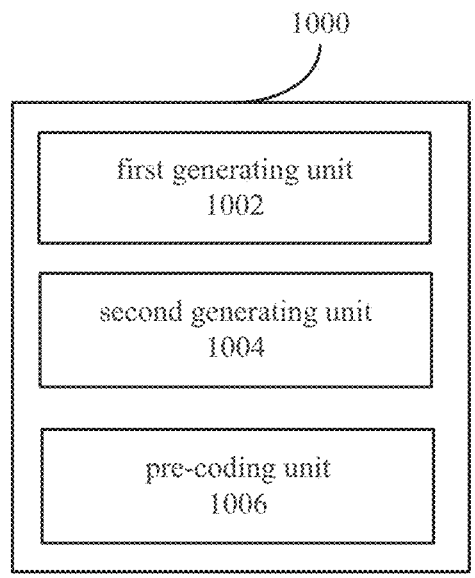
FIG. 10 shows a block diagram of a functional configuration example of a device in a wireless communication system according to another embodiment of the present disclosure.

FIG. 10 shows a block diagram of a functional configuration example of a device in a wireless communication system according to another embodiment of the present disclosure.

As shown in FIG. 10, a device 1000 according to the embodiment may include a first generating unit 1002, a second generating unit 1004 and a pre-coding unit 1006. Subsequently, functional configuration examples of respective units are described in detail respectively.

The first generating unit 1002 may be configured to generate a first pre-coding matrix according to first channel information on a channel between a first communication apparatus and a second communication apparatus.

As an example, the first channel information may be for example channel information in a vertical direction or preliminary information on the channel, which may be obtained by the two-stage channel estimation and feedback scheme according to the embodiment of the present disclosure described above or in other ways in the conventional technology. In this case, the generated first pre-coding matrix may be a pre-coding matrix in the vertical direction.

The second generating unit 1004 may be configured to generate a second pre-coding matrix according to the first pre-coding matrix and second channel information on the channel.

Figure 11:
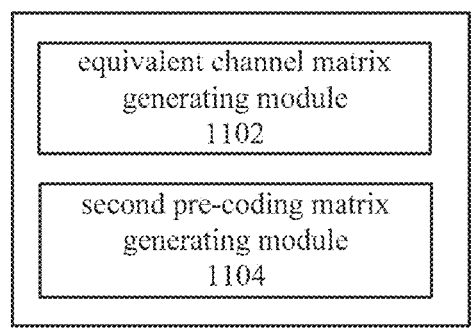
FIG. 11 shows a block diagram of a functional configuration example of a second generating unit in a device according to another embodiment of the present disclosure.

As an example, the second channel information may be for example channel information in a horizontal direction or further information on the channel, which may be obtained by the two-stage channel estimation and feedback scheme according to the embodiment of the present disclosure described above or in other ways in the conventional technology. In this case, the generated second pre-coding matrix may be a pre-coding matrix in the horizontal direction. Subsequently, specific functional configuration examples of the second generating unit 1004 is described in detail by referring to FIG. 11, to describe generation of the second pre-coding matrix in detail. FIG. 11 shows a block diagram of a functional configuration example of the second generating unit in the device according to an embodiment of the present disclosure.

As shown in FIG. 11, the second generating unit may further include an equivalent channel matrix generating module 1102 and a second pre-coding matrix generating module 1104.

The equivalent channel matrix generating module 1102 may be configured to generate an equivalent channel matrix according to the first pre-coding matrix and the second channel information. Specifically, the equivalent channel matrix generating module 1102 may generate the equivalent channel matrix according to an inner product of the first pre-coding matrix and the second channel information, and the equivalent channel matrix is used to describe an equivalent channel relative to a user after pre-coding in the vertical direction for example.

The second pre-coding matrix generating module 1104 may be configured to generate a second pre-coding matrix according to the generated equivalent channel matrix. The second pre-coding matrix may be a pre-coding matrix in a horizontal direction for example.

It should be understood that, for example, the generated first pre-coding matrix and second pre-coding matrix may be used to respectively eliminate interference between different user equipment in the vertical direction and the horizontal direction, which may be achieved by pre-coding algorithms which are not based on code books, for example ZF pre-coding, MMSE pre-coding and so on.

Subsequently, referring back to FIG. 10, a functional configuration example of the pre-coding unit 1006 is described continuously.

The pre-coding unit 1006 may be configured to pre-code a data signal according to the first pre-coding matrix and the second pre-coding matrix.

Figure 12:
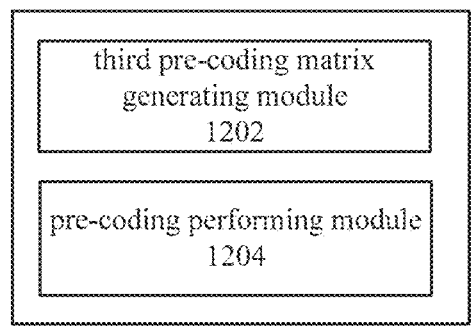
FIG. 12 shows a block diagram of a functional configuration example of a pre-coding unit in a device according to another embodiment of the present disclosure.

Specifically, a specific functional configuration example of the pre-coding unit 1006 is described by referring to FIG. 12, to describe how to pre-code a data signal according to the first pre-coding matrix and the second pre-coding matrix. FIG. 12 shows a block diagram of a functional configuration example of the pre-coding unit in the device according to an embodiment of the present disclosure.

As shown in FIG. 12, the pre-coding unit may further include a third pre-coding matrix generating module 1202 and a pre-coding performing module 1204.

The third pre-coding matrix generating module 1202 may be configured to generate a third pre-coding matrix according to the first pre-coding matrix and the second pre-coding matrix. Specifically, the third pre-coding matrix generating module 1202 may generate the third pre-coding matrix according to a Kronecker product of the first pre-coding matrix and the second pre-coding matrix.

The pre-coding performing module 1204 may be configured to pre-code a data signal utilizing the third pre-coding matrix. Thus, by pre-coding the data signal using the third pre-coding matrix generated in the above way, it is possible to eliminate interference between user equipment in the horizontal direction and the vertical direction for example, thereby simplifying the design for signal detection at receiving end (for example, the user equipment) and optimizing system performance.

It should be understood that, although description has been made by assuming that the first channel information and the second channel information are channel information in the vertical direction and the horizontal direction respectively, the present disclosure is not limited thereto. Alternatively, the first channel information may be preliminary information on the channel, the second channel information may be further information on the channel, without being limited to information in a certain direction, and the technology of the present disclosure also applies to this case.

Hereinafter a pre-coding scheme according to an embodiment of the present disclosure is described by taking a pre-coding scheme in a single-cell multi-user scene as an example.

It is assumed that the base station adopts a planar antenna array with a uniform spacing D, and a narrowband multi-path model in the single-cell multi-user scene is considered in the following:

$$H_k = \sum_{p=1}^{P} H_k^p$$

Where K indicates the number of users, $H_k \in C^{M_y \times M_x}$ indicates a channel matrix from a base station to a k-th user, $M_x$ and $M_y$ indicate the numbers of antennas in an antenna array in a horizontal direction and a vertical direction respectively, and P indicates the number of multiple paths. $H_k^P$ indicates a channel matrix corresponding to a p-th sub-path, and an element in row m and column n of the channel matrix is expressed as:

$$h_k^{m,n,p} = \rho_k^p \exp\left\{-j2\pi \frac{D}{\lambda}((m-1)\cos\theta_k^p \cos\beta_k^p + (n-1)\sin\beta_k^p)\right\}.$$

Where $\theta_k^P$ indicates an arrival angle in a horizontal direction, $\beta_k^P$ indicates an arrival angle in a vertical direction, and $\lambda$ indicates a signal wavelength. The channel matrix corresponding to the sub-path may be expressed as a form of a Kronecker product in the following:

$$H_k^P = \rho_k^P h_{h,k}^P \otimes (h_{v,k}^P)^T$$

Where a channel vector in a horizontal direction and a channel vector in a vertical direction are respectively expressed as:

$$h_{h,k}^p = \left[1, \ldots, \exp\left\{-j2\pi \frac{mD}{\lambda}\cos\theta_k^p \cos\beta_k^p\right\}, \ldots, \exp\left\{-j2\pi \frac{(M_x-1)D}{\lambda}\cos\theta_k^p \cos\beta_k^p\right\}\right]$$

$$h_{v,k}^p = \left[1, \ldots, \exp\left\{-j2\pi \frac{nD}{\lambda}\sin\beta_k^p\right\}, \ldots, \exp\left\{-j2\pi \frac{(M_y-1)D}{\lambda}\sin\beta_k^p\right\}\right]$$

Therefore, the channel matrix $H_k$ is expressed as:

$$H_k = \sum_{p=1}^{P} H_k^p = \sum_{p=1}^{P} \rho_k^p h_{h,k}^p \otimes (h_{v,k}^p)^T.$$

In order to utilize an extra degree of freedom introduced in the vertical direction in the 3D-MIMO system, the channel matrix is approximated as:

$$H_k \approx \left(\sum_{p=1}^{P} \rho_k^p h_{h,k}^p\right) \otimes \left(\sum_{p=1}^{P} h_{v,k}^p\right)^T;$$

Let $\overline{h}_{v,k} = \sum_{p=1}^{P} h_{v,k}^p$ indicate an approximate channel vector in the vertical direction. A pre-coding operation may be performed in the vertical direction and the horizontal direction respectively utilizing the above approximate expression.

In an example, the base station may measure an SRS signal sent by user equipment and obtain the channel matrix $H_k$ based on reciprocity between uplink/downlink channels. In addition, the base station may receive the SRS signal utilizing only the antenna in the vertical direction to obtain the channel vector in the vertical direction. Alternatively, as in the above embodiments, the base station may obtain a related channel matrix according to a CSI report, which is fed back by the user equipment by measuring a downlink reference signal.

The two-step pre-coding scheme proposed by the present disclosure is described briefly as follows.

Firstly, pre-coding in a vertical direction is performed. In a multi-user scene, a channel matrix in a vertical direction is constructed as:

$$\overline{H}_v = [\overline{h}_{v,1}^T, \ldots, \overline{h}_{v,K}^T]^T \in C^{M_y \times K}$$

For the channel matrix, different pre-coding methods may be adopted to eliminate interference between users in the vertical direction. For example, if a zero forcing pre-coding algorithm is adopted, a pre-coding matrix (i.e., the first pre-coding matrix) is calculated as $W_v = \overline{H}_v^H (\overline{H}_v \overline{H}_v^H)^{-1} \Gamma_v$, where $\Gamma_v$ indicates a diagonal matrix, for ensuring a power constrain of a sending vector. The pre-coding matrix is written as $W_v = [w_{v,1}, \ldots, w_{v,K}]$, where $w_{v,k} \in C^{M_y \times 1}$ indicates a pre-coding vector in a vertical direction corresponding to a k-th user.

Then, an equivalent channel vector in a horizontal direction is calculated. According to the channel matrix $H_k$ and the pre-coding vector $W_{v,k}$ in the vertical direction, an equivalent channel in a horizontal direction of the k-th user is calculated as:

$$h_{h,k}^e = ((H_k)^T w_{v,k})^T$$

Finally, a pre-coding matrix in a horizontal direction (i.e., the second pre-coding matrix described above) is calculated according to the equivalent channel in the horizontal direction. An equivalent channel matrix in a horizontal direction (i.e., the equivalent channel matrix described above) is constructed as:

$$H_h^e = [(h_{h,1}^e)^T, \ldots, (h_{h,K}^e)^T]^T \in C^{M_x \times K}$$

A pre-coding operation is performed according to the matrix. For example, in a case of adopting the zero forcing pre-coding, the pre-coding matrix in the horizontal direction (i.e., the second pre-coding matrix) is $W_h = (H_h^e)^H (H_h^e (H_h^e)^H)^{-1} \Gamma_h$, where the diagonal matrix $\Gamma_h$ is used to ensure the sending vector to satisfy a power constrain condition. The pre-coding matrix in the horizontal direction is expressed as $W_h = [w_{h,1}, \ldots, w_{h,K}]$, where $w_{h,K} \in C^{M_x \times 1}$ indicates a pre-coding vector in a horizontal direction of the k-th user, then a pre-coding matrix of the k-th user (i.e., the third pre-coding matrix described above) is constructed as:

$$W_k = (w_{h,k})^T \otimes w_{v,k}$$

As can be seen, with the pre-coding scheme of the present disclosure, the extra degree of freedom in the vertical direction can be utilized sufficiently. Therefore, as compared with the existing scheme, interference between users can be effectively reduced; and as compared with the full space pre-coding scheme, complexity of the pre-coding operation can be reduced significantly. In addition, in combination with the two-stage channel estimation and feedback scheme described above, the pre-coding scheme described above may be applied to scenes for example TDD, FDD and so on and is also adapted to a multi-cell scene. A simulation result for the multi-cell scene is described later by referring to FIG. 19 to FIG. 21.

It should be noted that, although the pre-coding scheme of the present disclosure is described by performing pre-coding in the vertical direction and the horizontal direction respectively, the present disclosure is not limited thereto, and the two-step pre-coding scheme may be applied to other cases according to the principle of the present disclosure, for example, two- or more- step pre-coding operation in directions in addition to the vertical direction and the horizontal direction, or performing the pre-coding operation by constructing a corresponding pre-coding matrix according to channel feedback information obtained at two times (for example, preliminary channel information and further channel information), without considering specific directions.

Figure 13:
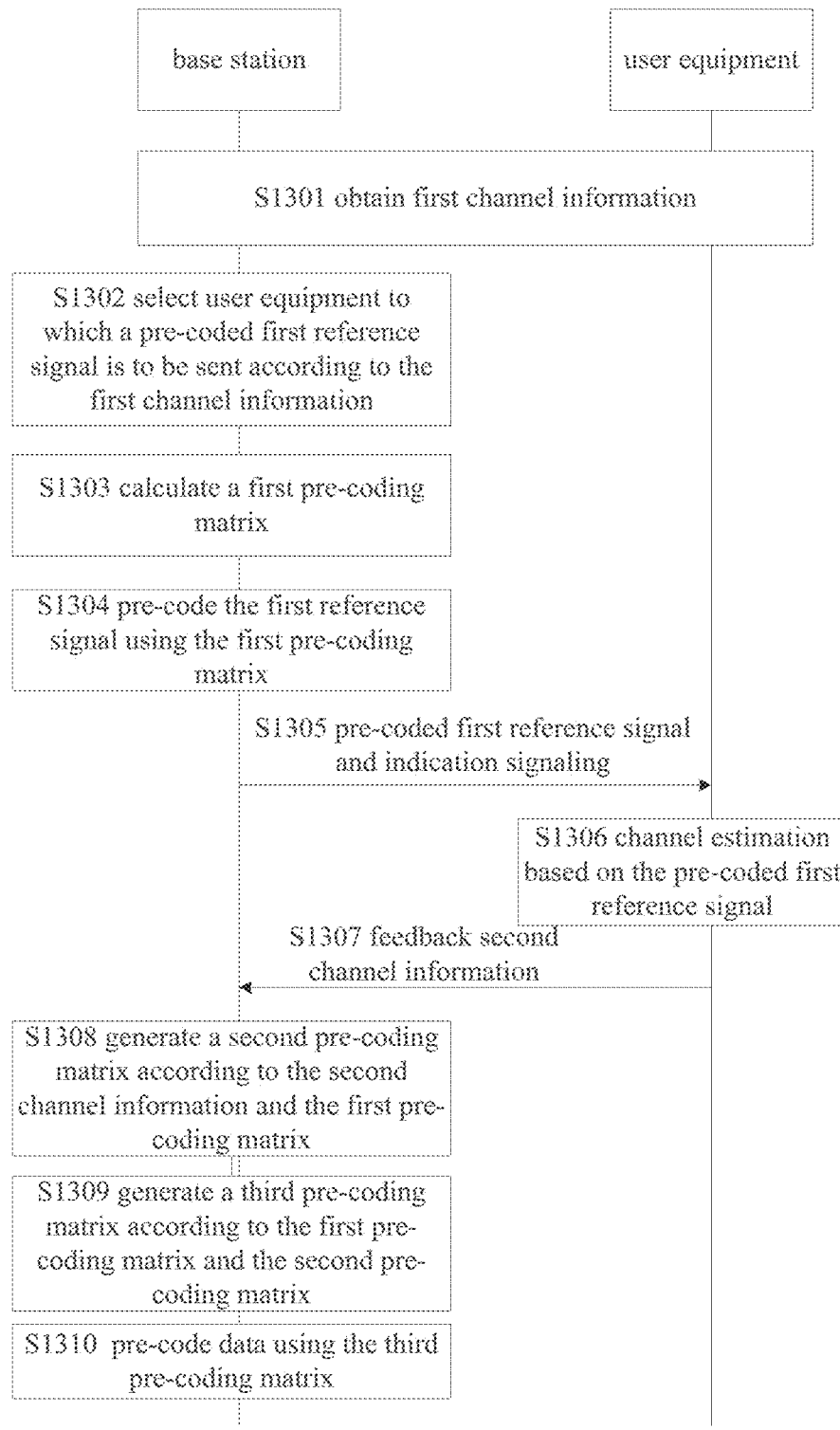
FIG. 13 shows a schematic diagram of an example of an interaction flow in a wireless communication system according to an embodiment of the present disclosure.

Subsequently, in order to facilitate understanding of the above process, an example of an interaction process regarding channel estimation and feedback and subsequent data signal pre-coding between a first communication apparatus and a second communication apparatus is described by referring to a flowchart shown in FIG. 13. FIG. 13 shows a schematic diagram of an example of an interaction process in a wireless communication system according to an embodiment of the present disclosure. Here, description is made by taking an interaction between a base station and user equipment as an example, but the present disclosure is not limited thereto.

As shown in FIG. 13, firstly, in step S1301, the base station may obtain first channel information in any exemplary way described by referring to FIG. 8 or FIG. 9. Subsequently, in step S1302, the base station may select user equipment to which a pre-coded first reference signal is to be sent according to the first channel information, calculate a first pre-coding matrix based on the selection result in step S1303, and pre-code the first reference signal utilizing the first pre-coding matrix in step S1304. Subsequently, in step S1305, the base station sends the pre-coded first reference signal and corresponding measurement configuration information to the user equipment. In step S1306, the user equipment performs, in response to the measurement configuration information, channel estimation according to the pre-coded first reference signal, and in step S1307, the user equipment feeds back second channel information obtained by estimation to the base station. Subsequently, in step S1308, the base station may calculate, by utilizing the above methods, a second pre-coding matrix according to the second channel information and the first pre-coding matrix. In step S1309, the base station calculates a third pre-coding matrix according to a Kronecker product of the first pre-coding matrix and the second pre-coding matrix, and pre-codes a data signal utilizing the third pre-coding matrix in step S1310.

It should be understood that, the above interaction process is only exemplary, and those skilled in the art may modify the above interaction process according to the principle of the present disclosure. For example, the selection operation in step S1302 may be omitted, and the pre-coded first reference signal may be directly sent to all user equipment, but this might result in a waste of resources.

Figure 14:
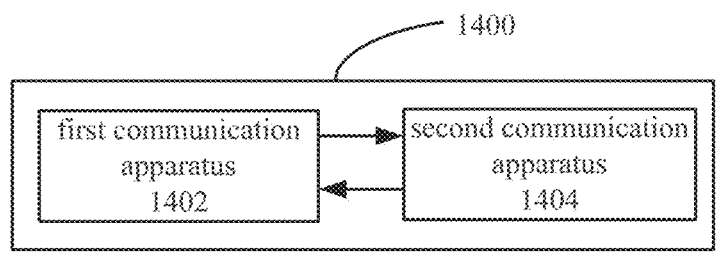
FIG. 14 shows a block diagram of a schematic structure of a wireless communication system according to an embodiment of the present disclosure.

Subsequently, an example of a structure of a wireless communication system according to an embodiment of the present disclosure is described by referring to FIG. 14. FIG. 14 shows a block diagram of an example of a structure of a wireless communication system according to an embodiment of the present disclosure.

As shown in FIG. 14, a wireless communication system 1400 according to the embodiment may include a first communication apparatus 1402 and a second communication apparatus 1404.

The first communication apparatus 1402 may be configured to: acquire first channel information on a channel between the first communication apparatus and the second communication apparatus; pre-code a first reference signal based on the first channel information; generate measurement configuration information for the second communication apparatus, where the measurement configuration information includes a measurement indication for the pre-coded first reference signal; and control data signal transmission based on second channel information, which is fed back for the pre-coded first reference signal by the second communication apparatus according to the measurement configuration information. The first communication apparatus 1402 may be a base station for example, which may include the device described by referring to FIG. 1 to FIG. 4.

The second communication apparatus 1404 may be configured to: measure the pre-coded first reference signal based on the measurement configuration information; and generate feedback information as the second channel information based on measurement for the pre-coded first reference signal. The second communication apparatus 1404 may be user equipment for example, which may include the device described by referring to FIG. 5 to FIG. 7 for example.

It should be understood that, although functional configuration examples of the devices in a wireless communication system and the wireless communication system and examples of the interaction process between corresponding communication apparatuses according to the embodiments of the present disclosure are described above, they are only exemplary and not intended to be limitations. Those skilled in the art may modify the above embodiments according to the principles of the present disclosure, for example, add, delete and/or combine functional modules in various embodiments, and all of such modifications fall within the scope of the present disclosure.

Corresponding to the above device embodiments, methods in a wireless communication system are further provided according to an embodiment of the present disclosure. Hereinafter process examples of methods in a wireless communication system according to an embodiment of the present disclosure are described in detail by referring to FIG. 15 to FIG. 17 respectively.

Figure 15:
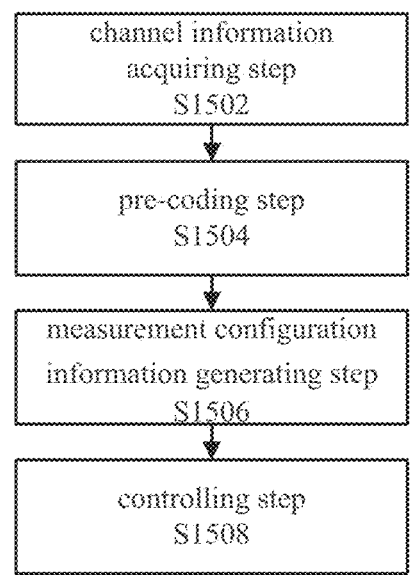
FIG. 15 shows a flowchart of a process example of a method in a wireless communication system according to an embodiment of the present disclosure.

FIG. 15 shows a flowchart of a process example of a method in a wireless communication system according to an embodiment of the present disclosure. The method according to the embodiment corresponds to the device at the base station end described above.

As shown in FIG. 15, the method according to the embodiment may include a channel information acquiring step S1502, a pre-coding step S1504, a measurement configuration information generating step S1506 and a controlling step S1508. Subsequently processing in various steps is described respectively.

In the channel information acquiring step S1502, first channel information on a channel between a first communication apparatus and a second communication apparatus may be acquired. The first channel information may be acquired in any way described by referring to FIG. 8 or FIG. 9, and the first channel information may be information in an altitude or angular direction or preliminary information on the channel.

Subsequently, in the pre-coding step S1504, a first reference signal may be pre-coded based on the first channel information. The pre-coding processing may be performed utilizing a pre-coding algorithm which is not based on a code book, for example a ZF pre-coding algorithm, an MMSE pre-coding algorithm and the like, to eliminate interference between different user equipment for example.

Subsequently, in the measuring configuration information generating step S1506, measurement configuration information for the second communication apparatus may be generated. The measurement configuration information may include a measurement indication for the pre-coded first reference signal, to indicate to the second communication apparatus (for example, the user equipment) which reference signal is to be measured.

Subsequently, in the controlling step S1508, data signal transmission may be controlled based on second channel information, which is fed back for the pre-coded first reference signal by the second communication apparatus according to the measurement configuration information. For example, operations such as pre-coding the data signal, scheduling and so on may be performed based on the second channel information.

Figure 16:
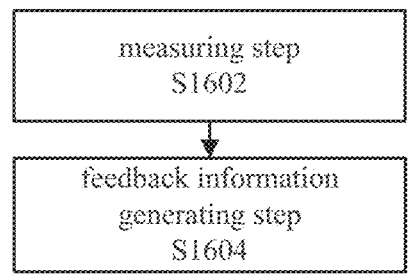
FIG. 16 shows a flowchart of a process example of a method in a wireless communication system according to another embodiment of the present disclosure.

FIG. 16 shows a flowchart of a process example of a method in a wireless communication system according to another embodiment of the present disclosure. The method according to the embodiment corresponds to the device at the user equipment end described above.

As shown in FIG. 16, the method according to the embodiment may include a measuring step S1602 and a feedback information generating step S1604.

In the measuring step S1602, a pre-coded first reference signal from a first communication apparatus may be measured based on measurement configuration information for second communication apparatus from the first communication apparatus, where the measurement configuration information may include a measurement indication for the pre-coded first reference signal. As an example, the first reference signal may be a reference signal in an angular or altitude direction, or a reference signal in any direction.

Subsequently, in the feedback information generating step S1604, based on measurement for the pre-coded first reference signal, feedback information may be generated as second channel information on a channel between the first communication apparatus and the second communication apparatus, for the first communication apparatus to control data signal transmission. The second channel information may be channel information in an angular direction or an altitude direction for example, or further information on the channel.

Preferably, in the measuring step S1602, a second reference signal from the first communication apparatus (for example, a reference signal in the altitude direction or angular direction, or a reference signal in any direction) may be measured, and in the feedback information generating step S1604, feedback information for the second reference signal is generated as first channel information, for the first communication apparatus to pre-code the first reference signal, allocate radio resources to the user equipment and so on.

Figure 17:
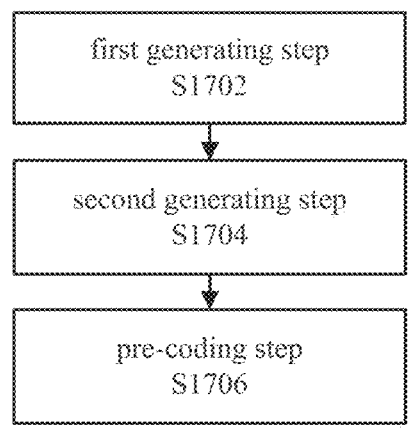
FIG. 17 shows a flowchart of a process example of a method in a wireless communication system according to another embodiment of the present disclosure.

FIG. 17 shows a flowchart of a process example of a method in a wireless communication system according to another embodiment of the present disclosure. The method according to the embodiment corresponds to the device for pre-coding a data signal at the base station end described above.

As shown in FIG. 17, the method according to the embodiment may include a first generating step S1702, a second generating step S1704 and a pre-coding step S1706.

In the first generating step S1702, a first pre-coding matrix may be generated according to first channel information on a channel between a first communication apparatus and a second communication apparatus. The first channel information may be the first channel information obtained by the above methods, or channel information obtained by other methods.

Subsequently, in the second generating step S1704, a second pre-coding matrix may be generated according to the first pre-coding matrix and second channel information on the channel. The second channel information may be the second channel information obtained by the above methods, or channel information obtained by other methods.

Subsequently, in the pre-coding step S1706, a data signal may be pre-coded according to the first pre-coding matrix and the second pre-coding matrix. Specifically, a third pre-coding matrix may be generated according to a Kronecker product of the first pre-coding matrix and the second pre-coding matrix, and the data signal is pre-coded utilizing the third pre-coding matrix.

It should be noted that, process examples of the methods in the wireless communication system according to the embodiments of the present disclosure are described above, but these are only examples and not intended to be limitations. Those skilled in the art may modify the above embodiments according to the principles of the present disclosure, for example add, delete and/or combine steps in various embodiments or the like, and all of such modifications fall within the scope of the present disclosure.

In addition, it should be noted that, the method embodiments here correspond to the device embodiments described above, and hence contents which are not described in detail in the method embodiments may be referred to the description at corresponding positions of the device embodiments, and are not repeated here.

In addition, an electronic apparatus is further provided according to an embodiment of the present disclosure. The electronic apparatus may include one or more processors configured to perform the methods in a wireless communication system according to the embodiments of the present disclosure.

It should be understood that machine-executable instructions in a storage medium and a program product according to the embodiments of the present disclosure may be also configured to execute the methods corresponding to the apparatus embodiments described above, thus contents which are not described in detail may be referred to foregoing description at corresponding positions, which are not described repeatedly here anymore.

Accordingly, a storage medium on which the above program product storing machine executable instructions is carried is also included in the disclosure. The storage medium includes but not limited to a floppy disk, an optical disk, a magneto-optical disk, a storage card, a memory rod and the like.

Furthermore, it shall be noted that the foregoing series of processes and apparatuses can also be embodied in software and/or firmware. In the case of being embodied in software and/or firmware, a program constituting the software is installed from a storage medium or a network to a computer with a dedicated hardware structure, e.g., a general purpose personal computer 1800 illustrated in FIG. 18, which can perform various functions when various programs are installed thereon.

Figure 18:
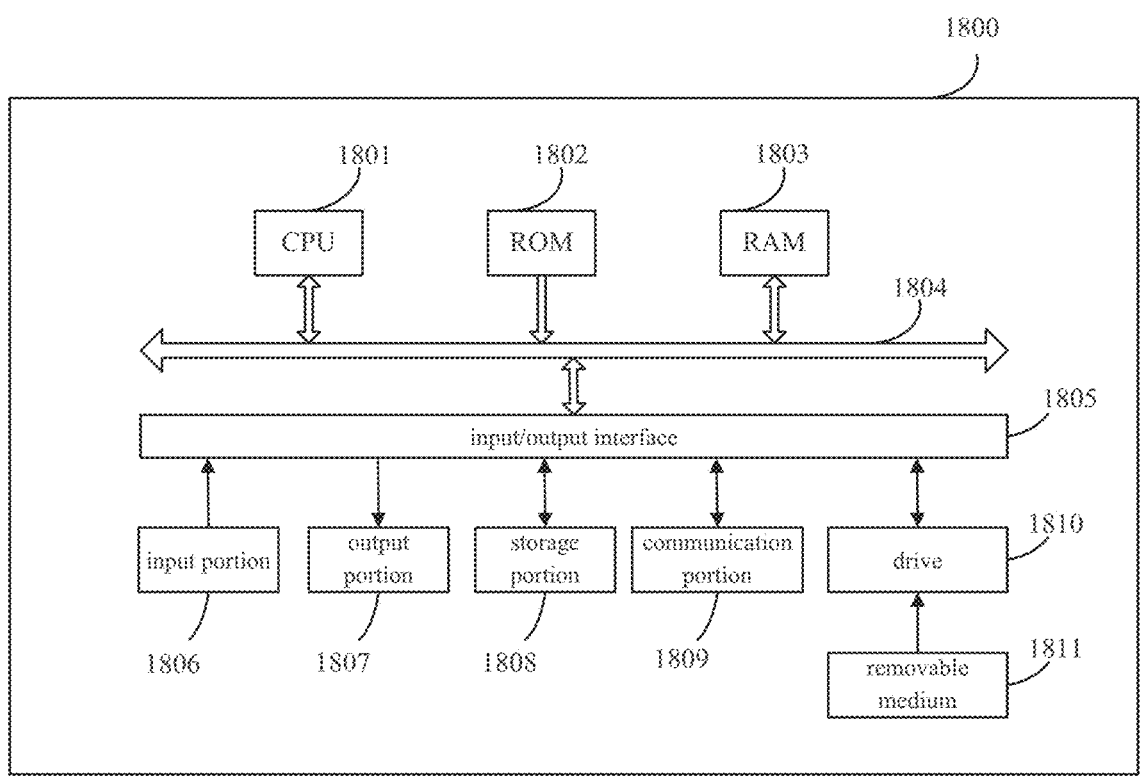
FIG. 18 is a block diagram of an exemplary structure of a personal computer as an information processing apparatus that may be adopted in an embodiment of the present disclosure.

In FIG. 18, a Central Processing Unit (CPU) 1801 performs various processes according to a program stored in a Read Only Memory (ROM) 1802 or loaded from a storage portion 1808 into a Random Access Memory (RAM) 1803 in which data required when the CPU 1801 performs the various processes is also stored as needed.

The CPU 1801, the ROM 1802 and the RAM 1803 are connected to each other via a bus 1804 to which an input/output interface 1805 is also connected.

The following components are connected to the input/output interface 1805: an input portion 1806 including a keyboard, a mouse, etc.; an output portion 1807 including a display, e.g., a Cathode Ray Tube (CRT), a Liquid Crystal Display (LCD), etc., a speaker, etc.; a storage portion 1808 including a hard disk, etc.; and a communication portion 1809 including a network interface card, e.g., an LAN card, a modem, etc. The communication portion 1809 performs a communication process over a network, e.g., the Internet.

A drive 1810 is also connected to the input/output interface 1805 as needed. A removable medium 1811, e.g., a magnetic disk, an optical disk, an magneto optical disk, a semiconductor memory, etc., can be installed on the drive 1810 as needed so that a computer program fetched therefrom can be installed into the storage portion 1808 as needed.

In the case that the foregoing series of processes are performed in software, a program constituting the software is installed from a network, e.g., the Internet, etc., or a storage medium, e.g., the removable medium 1811, etc.

Those skilled in the art shall appreciate that such a storage medium will not be limited to the removable medium 1811 illustrated in FIG. 18 in which the program is stored and which is distributed separately from the apparatus to provide a user with the program. Examples of the removable medium 1811 include a magnetic disk (including a Floppy Disk (a registered trademark)), an optical disk (including Compact Disk-Read Only memory (CD-ROM) and a Digital Versatile Disk (DVD)), a magneto optical disk (including a Mini Disk (MD) (a registered trademark)) and a semiconductor memory. Alternatively the storage medium can be the ROM 1802, a hard disk included in the storage portion 1808, etc., in which the program is stored and which is distributed together with the apparatus including the same to the user.

Figure 19:
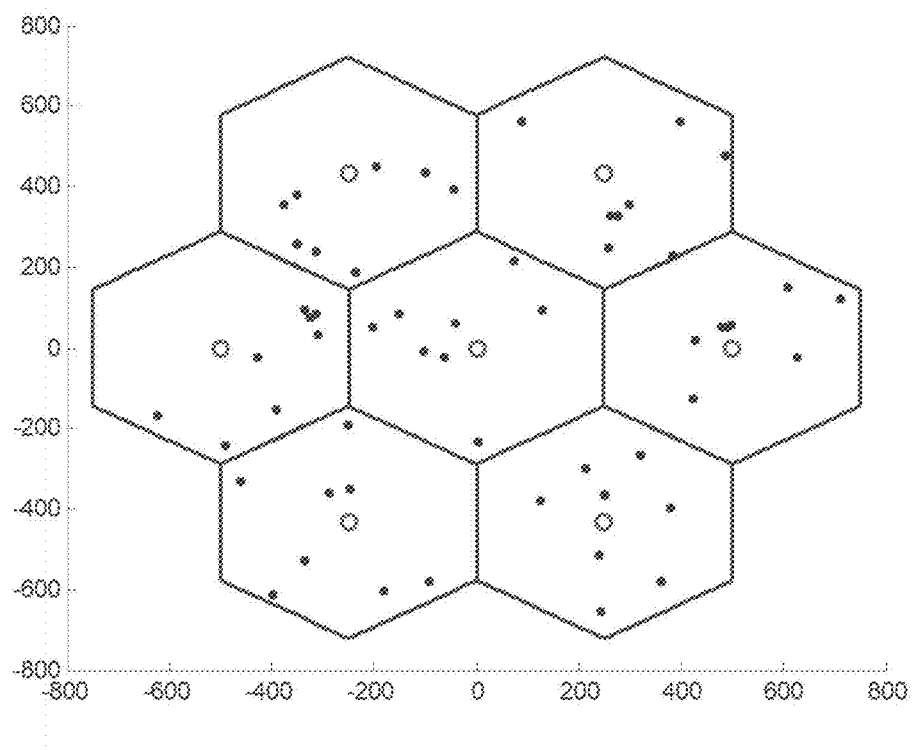
FIG. 19 is a schematic diagram of a apparatus distribution example in a wireless communication system according to an embodiment of the present disclosure.
Figure 20:
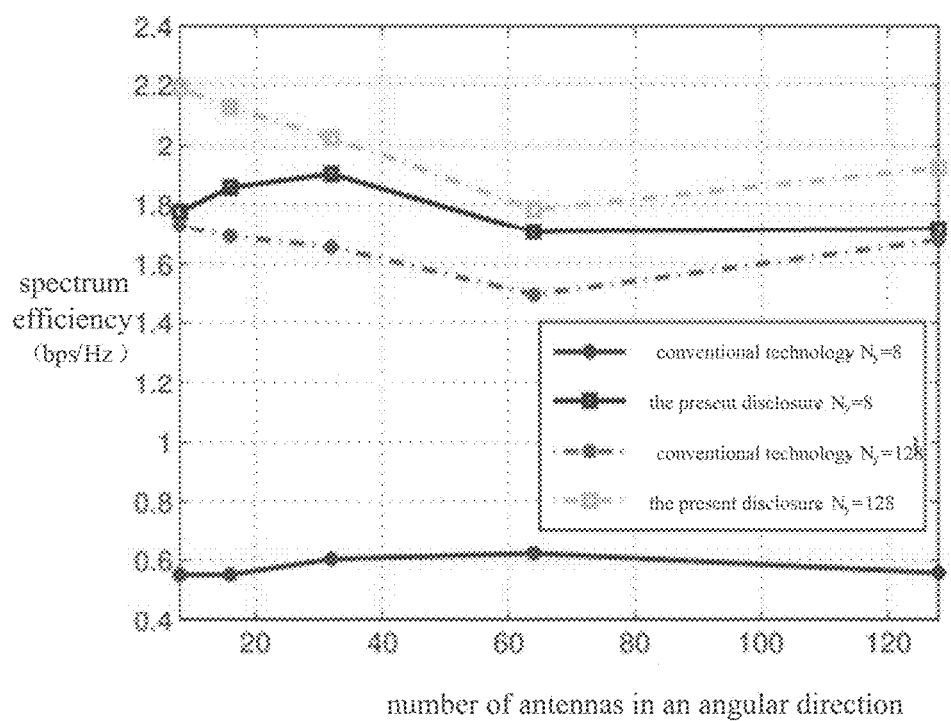
FIG. 20 shows a schematic diagram of a comparison example of spectrum efficiency in a wireless communication system to which the conventional technology is applied and spectrum efficiency in a wireless communication system to which the technology of the present disclosure is applied.

Subsequently, simulation of the system performance in a case that the technology of the present disclosure is applied is described by referring to FIG. 19 to FIG. 21, so as to illustrate improvement in the system performance achieved by the technology of the present disclosure as compared with the conventional technology.

A multiple-cell multiple-user scene is considered. Let L=7 indicate the number of cells and K=8 indicate the number of users served in the same time-frequency resource. A base station is located at a center of each cell, and user equipment are distributed randomly. FIG. 19 shows a schematic diagram of an example of distribution of communication apparatuses in a simulation. For spread of an arrival angle, it is assumed that the spread of an angle in a horizontal direction is 180 degrees, the spread of an angle in a vertical direction is only 5 degrees, and the arrival angle follows uniform distribution.

It is assumed that the base station has acquired the channel status information using the two-stage channel estimation and feedback scheme according to the embodiment of the present disclosure described above. It is assumed that $H_{kls} \in C^{M_y \times M_x}$ indicates a channel matrix from a base station in an s-th cell to k-th user equipment in an l-th cell. The following narrowband channel model is adopted in the simulation:

$$H_{kls} \in C^{M_y \times M_x} = \sum_{p=1}^{P} H_{kls}^p.$$

Where P=10 indicates the number of multiple paths. A matrix $H_{kls}^p$ indicates a channel matrix of the p-th sub-path. An element in row m and column n of the matrix $H_{kls}^p$ is:

$$h_{kls}^{m,n,p} = \rho_{kls}^p \exp\left\{-j2\pi \frac{D}{\lambda}((m-1)\cos\theta_{kls}^p \cos\beta_{kls}^p + (n-1)\sin\beta_{kls}^p)\right\}.$$

Where $\theta_{kls}^p$ and $\beta_{kls}^p$ indicate arrival angles in a horizontal direction and a vertical direction respectively. $\rho_{kls}^p$ indicates a large-scale fading coefficient and is calculated from the following equation:

$$\rho_{kls}^p = z_{kls}^p / (d_{kls})^\alpha$$

Where $d_{kls}$ indicates a distance from a base station in an s-th cell to k-th user equipment in an l-th cell, $\alpha$ indicates a path loss coefficient, $z_{kls}^p$ indicates a shadow fading coefficient and follows a logarithm normal distribution with a variance $\sigma_z^2$. In the simulation, it is assumed that $\alpha$=3.5, $\sigma_z$=8 dB.

An estimated channel obtained at the base station end of the l-th cell is:

$$H_{kll} = H_{kll} + \sum_{s \neq l} H_{kls}.$$

The base station in the l-th cell obtains a pre-coding matrix utilizing the estimated channel in the above equation and uses the same to transmit downlink data.

Simulations are performed by adopting the existing scheme and the two-stage pre-coding scheme according to the present disclosure to perform a pre-coding operation, and differences between the system performance when adopting different pre-coding schemes are compared. Simulation results in two exemplary cases are described in the following.

A first case: a radius of a cell is 200 m, and a height of a base station is 35 m. It is assumed that heights of all user equipment are 1.5 m in the case. FIG. 20 shows a simulation result in the first case. FIG. 20 shows a schematic diagram of a comparison example between spectrum efficiency in a wireless communication system to which the conventional technology is applied and spectrum efficiency in a wireless communication system to which the technology of the present disclosure is applied. In FIG. 20, the number of antennas in a vertical direction is fixed as $M_y$=8 and $M_y$=128, and the number of antennas in a horizontal direction is variable. It may be seen from FIG. 20 that, as compared with the conventional scheme, better system performance is achieved according to the two-step pre-coding scheme of the present disclosure. For example, in a case that $M_y$=8, the spectrum efficiency can reach about 1.6 bps/Hz when using the two-step pre-coding scheme, and the spectrum efficiency can only reach about 0.6 bps/Hz when using the conventional scheme. In a case that $M_y$=128, the gain obtained by the scheme according to the present disclosure still exceeds 0.2 bps/Hz. In addition, it may be seen from FIG. 20 that, the greater $M_y$ (i.e., the number of antennas in the vertical direction) is, the greater the spectrum efficiency is. For example, in a case that $M_y$ is increased from 8 to 128, the spectrum efficiency achieved by the scheme of the present disclosure is improved from a value less than 2 bps/Hz to about 2.3 bps/Hz, since the greater $M_y$ is, the more accurate the pre-coding in the vertical direction is, thereby improving the overall performance.

For a second case, simulation parameters are selected with reference to 3GPP TR 36.873. Particularly, simulation environment is a large cell in a city with a high user density. A radius of the cell is 250 m, and a height of a base station is 25 m. A height of user equipment is generated from the following equation:

$$h_{UE}=3(n_{fl}-1)+1.5$$

In which, $h_{UE}$ indicates the height of user equipment, $n_{fl}$ follows uniform distribution within an interval of [1, $N_{fl}$], and $N_{fl}$ follows uniform distribution within an interval of [4, 8].

Figure 21:
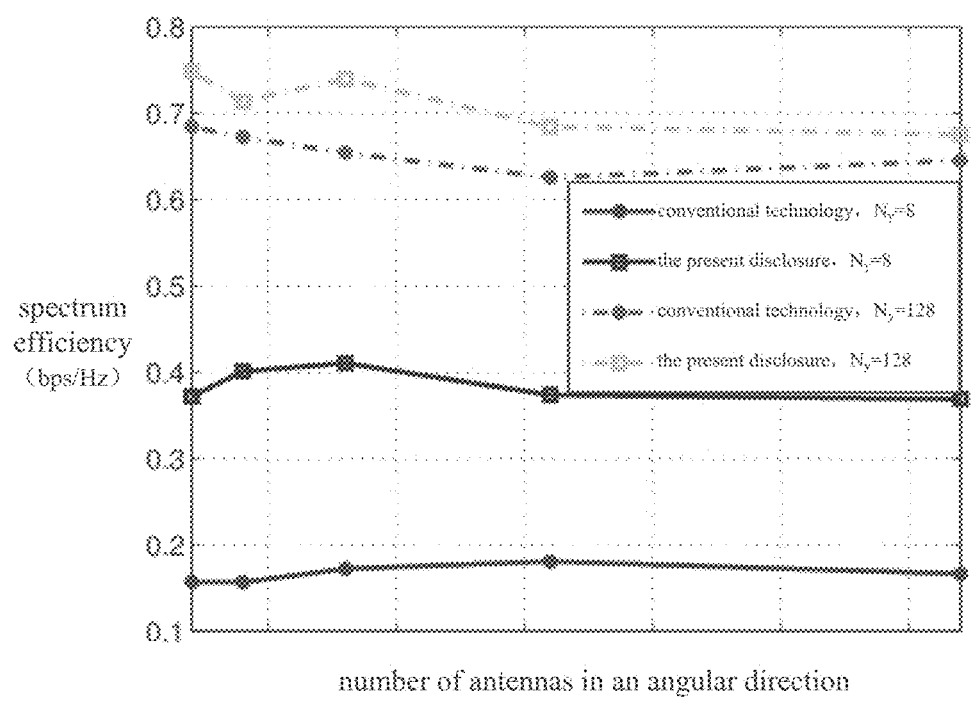
FIG. 21 shows a schematic diagram of another comparison example of spectrum efficiency in a wireless communication system to which the conventional technology is applied and spectrum efficiency in a wireless communication system to which the technology of the present disclosure is applied.

FIG. 21 shows a simulation result in the second case. FIG. 21 shows a schematic diagram of another comparison example between spectrum efficiency in a wireless communication system to which the conventional technology is applied and spectrum efficiency in a wireless communication system to which the technology of the present disclosure is applied. Since a radius of a cell becomes large, more user equipment will suffer from inter-cell interference, and hence average spectrum efficiency is reduced to a certain degree. However, as compared with the conventional solution, better system performance is still achieved with the scheme of the present disclosure. Similarly, as described above, the system performance achieved by the scheme of the present disclosure will be improved when more antennas are arranged in a vertical direction.

It may be seen from the above simulation results that, as compared with the conventional scheme, by considering channel status between a base station and all user equipment, degree of freedom introduced by the antennas in the vertical direction can be better utilized by the pre-coding solution in the vertical direction, hence intra-cell interference is reduced significantly and the overall performance is improved. In addition, in a case of combining the conventional antenna titling technology and beamforming technology, inter-cell interference generated due to pilot multiplexing is also reduced, thereby further improving the system performance.

In addition, it should be noted that, according to the simulation result, it might be inappropriate to select a discrete Fourier transform (DFT) vector as a code book in the vertical direction, and it needs to design a code book which is better adapted to a massive 3D-MIMO system.

Subsequently, application examples according to the present disclosure are described by referring to FIG. 22 to FIG. 24.

[Application Example Regarding eNB]
(First Application Example)

Figure 22:
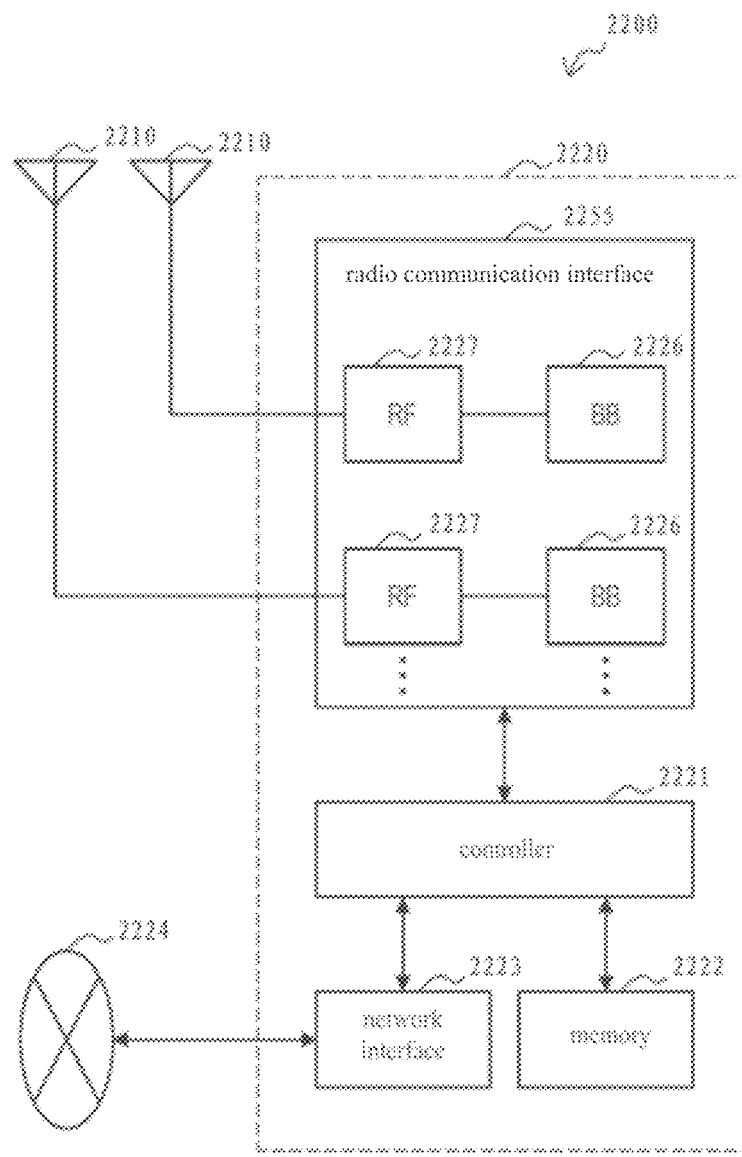
FIG. 22 shows a block diagram of a first example of a schematic configuration of an evolutional based station (eNB) to which the technology of the present disclosure may be applied.

FIG. 22 is a block diagram illustrating a first example of a schematic configuration of an eNB to which the technology of the present disclosure may be applied. An eNB 2200 includes one or more antennas 2210 and a base station apparatus 2220. Each antenna 2210 and the base station apparatus 2220 may be connected to each other via an RF cable.

Each of the antennas 2210 includes a single or multiple antenna elements (such as multiple antenna elements included in a multiple input multiple output (MIMO) antenna), and is used for the base station apparatus 2220 to transmit and receive radio signals. The eNB 2200 may include multiple antennas 2210, as illustrated in FIG. 22. For example, the multiple antennas 2210 may be compatible with multiple frequency bands used by the eNB 2200. Although FIG. 22 illustrates the example in which the eNB 2200 includes the multiple antennas 2210, the eNB 2200 may also include a single antenna 2210.

The base station apparatus 2220 includes a controller 2221, a memory 2222, a network interface 2223 and a radio communication interface 2225.

The controller 2221 may be, for example, a CPU or a DSP, and operates various functions of a higher layer of the base station apparatus 2220. For example, the controller 2221 generates a data packet from data in signals processed by the radio communication interface 2225, and transfers the generated packet via the network interface 2223. The controller 2221 may bundle data from multiple base band processors to generate the bundled packets, and transfer the generated bundled packet. The controller 2221 may have logical functions of performing control such as radio resource control, radio bearer control, mobility management, admission control and scheduling. The control may be performed in corporation with an eNB or a core network node in the vicinity. The memory 2222 includes RAM and ROM, and stores a program that is executed by the controller 2221, and various types of control data (such as a terminal list, transmission power data and scheduling data).

The network interface 2223 is a communication interface for connecting the base station apparatus 2220 to a core network 2224. The controller 2221 may communicate with a core network mode or another eNB via the network interface 2223. In that case, the eNB 2200, and the core network node or the other eNB may be connected to each other through a logical interface (such as an S1 interface and an X2 interface). The network interface 2223 may also be a wired communication interface or a radio communication interface for radio backhaul. If the network interface 2223 is a radio communication interface, the network interface 2223 may use a higher frequency band for radio communication than a frequency band used by the radio communication interface 2225.

The radio communication interface 2225 supports any cellular communication scheme such as Long Term Evolution (LTE) and LTE-advanced, and provides radio connection to a terminal positioned in a cell of the eNB 2200 via the antenna 2210. The radio communication interface 2225 may typically include, for example, a baseband (BB) processor 2226 and an RF circuit 2227. The BB processor 2226 may perform, for example, encoding/decoding, modulating/demodulating, and multiplexing/demultiplexing, and performs various types of signal process of layers (such as L1, medium access control (MAC), radio link control (RLC), and a packet data convergence protocol (PDCP). The BB processor 2226 may have a part or all of the above-described logical functions instead of the controller 2221. The BB processor 2226 may be a memory that stores a communication control program, or a module that includes a processor and a related circuit configured to execute the program. Updating the program may allow the functions of the BB processor 2226 to be changed. The module may be a card or a blade that is inserted into a slot of the base station apparatus 2220. Alternatively, the module may also be a chip that is mounted on the card or the blade. Meanwhile, the RF circuit 2227 may include, for example, a mixer, a filter, and an amplifier, and transmits and receives radio signals via the antenna 2210.

The radio communication interface 2225 may include the multiple BB processors 2226, as illustrated in FIG. 22. For example, the multiple BB processors 2226 may be compatible with multiple frequency bands used by the eNB 2200. The radio communication interface 2225 may include the multiple RF circuits 2227, as illustrated in FIG. 22. For example, the multiple RF circuits 2227 may be compatible with multiple antenna elements. Although FIG. 22 illustrates the example in which the radio communication interface 2225 includes the multiple BB processor 2226 and the multiple RF circuits 2227, the radio communication interface 2225 may also include a single BB processor 2226 or a single RF circuit 2227.

(Second Application Example)

Figure 23:
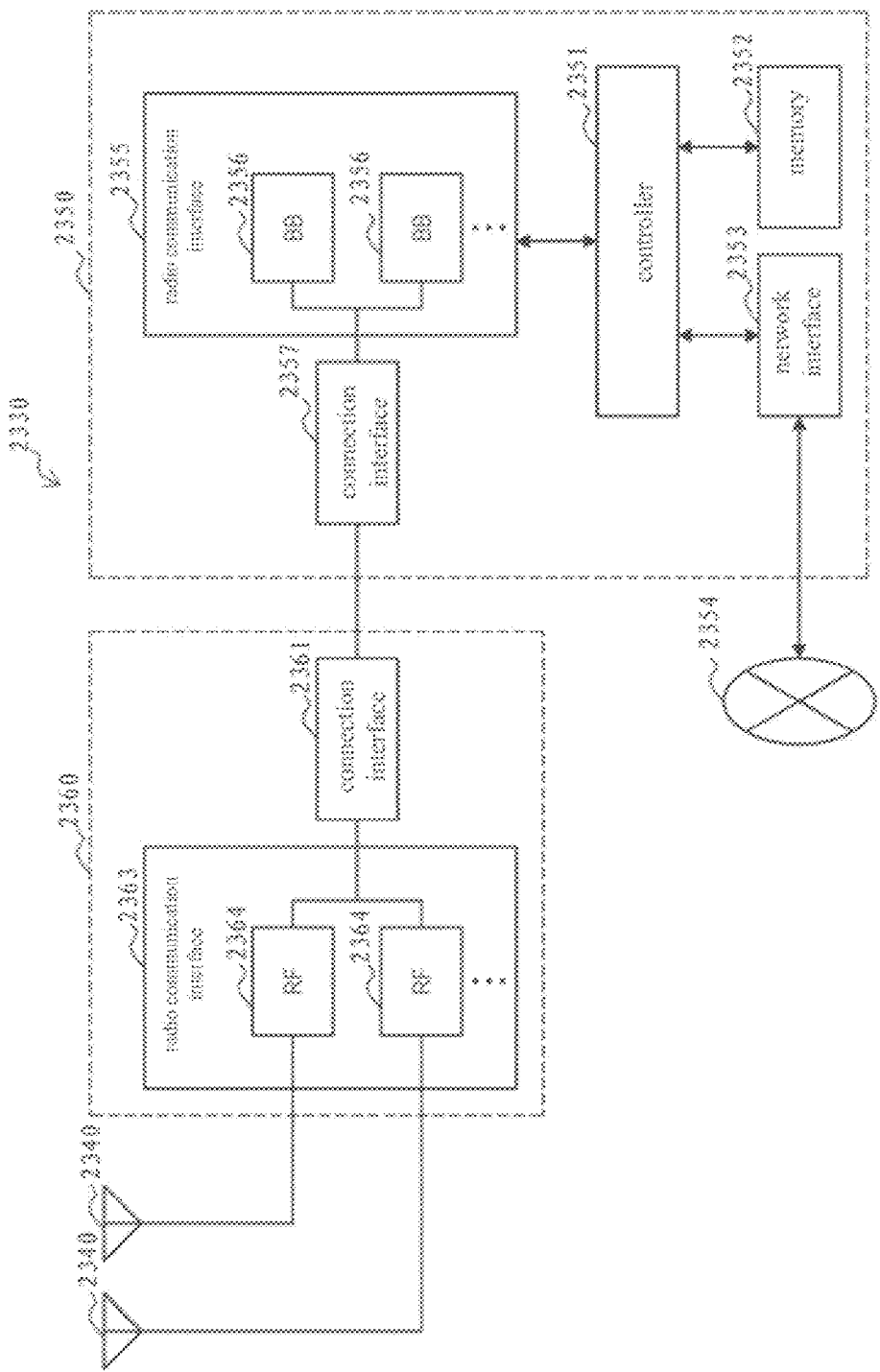
FIG. 23 shows a block diagram of a second example of a schematic configuration of an eNB to which the technology of the present disclosure may be applied.

FIG. 23 is a block diagram illustrating a second example of a schematic configuration of an eNB to which the technology of the present disclosure may be applied. An eNB 2330 includes one or more antennas 2340, a base station apparatus 2350 and an RRH 2360. Each antenna 2340 and the RRH 2360 may be connected to each other via an RF cable. The base station apparatus 2350 and the RRH 2360 may be connected to each other via a high speed line such as an optical fiber cable.

Each of the antennas 2340 includes a single or multiple antenna elements (such as multiple antenna elements included in an MIMO antenna), and is used for the RRH 2360 to transmit and receive radio signals. The eNB 2330 may include the multiple antennas 2340, as illustrated in FIG. 23. For example, the multiple antennas 2340 may be compatible with multiple frequency bands used by the eNB 2330. Although FIG. 23 illustrates the example in which the eNB 2330 includes the multiple antennas 2340, the eNB 2330 may also include a single antenna 2340.

The base station apparatus 2350 includes a controller 2351, a memory 2352, a network interface 2353, a radio communication interface 2355 and a connection interface 2357. The controller 2351, the memory 2352, and the network interface 2353 are the same as the controller 2221, the memory 2222 and the network interface 2223 described with reference to FIG. 22.

The radio communication interface 2355 supports any cellular communication scheme such as LTE and LTE-Advanced, and provides radio communication to a terminal positioned in a sector corresponding to the RRH 2360 via the RRH 2360 and the antenna 2340. The radio communication interface 2355 may typically include, for example, a BB processor 2356. The BB processor 2356 is the same as the BB processor 2226 described with reference to FIG. 22, except the BB processor 2356 is connected to the RF circuit 2364 of the RRH 2360 via the connection interface 2357. The radio communication interface 2355 may include the multiple BB processors 2356, as illustrated in FIG. 23. For example, the multiple BB processors 2356 may be compatible with multiple frequency bands used by the eNB 2330. Although FIG. 23 illustrates the example in which the radio communication interface 2355 includes the multiple BB processors 2356, the radio communication interface 2355 may also include a single BB processor 2356.

The connection interface 2357 is an interface for connecting the base station apparatus 2350 (radio communication interface 2355) to the RRH 2360. The connection interface 2357 may also be a communication module for communication in the above-described high speed line that connects the base station apparatus 2350 (radio communication interface 2355) to the RRH 2360.

The RRH 2360 includes a connection interface 2361 and a radio communication interface 2363.

The connection interface 2361 is an interface for connecting the RRH 2360 (radio communication interface 2363) to the base station apparatus 2350. The connection interface 2361 may also be a communication module for communication in the above-described high speed line.

The radio communication interface 2363 transmits and receives radio signals via the antenna 2340. The radio communication interface 2363 may typically include, for example, the RF circuit 2364. The RF circuit 2364 may include, for example, a mixer, a filter, and an amplifier, and transmits and receives radio signals via the antenna 2340. The radio communication interface 2363 may include multiple RF circuits 2364, as illustrated in FIG. 23. For example, the multiple RF circuits 2364 may support multiple antenna elements. Although FIG. 23 illustrates the example in which the radio communication interface 2363 includes the multiple RF circuits 2364, the radio communication interface 2363 may also include a single RF circuit 2364.

In the eNB 2200 and the eNB 2330 illustrated in FIGS. 22 and 23, the transceiving unit 402 described by using FIG. 4 may be implemented by the radio communication interface 2225, and the radio communication interface 2355 and/or the radio communication interface 2363. At least a part of the functions of the device at the base station end in the wireless communication system described above may also be implemented by the controller 2221 and the controller 2351.

[Application Example Regarding User Equipment]

Figure 24:
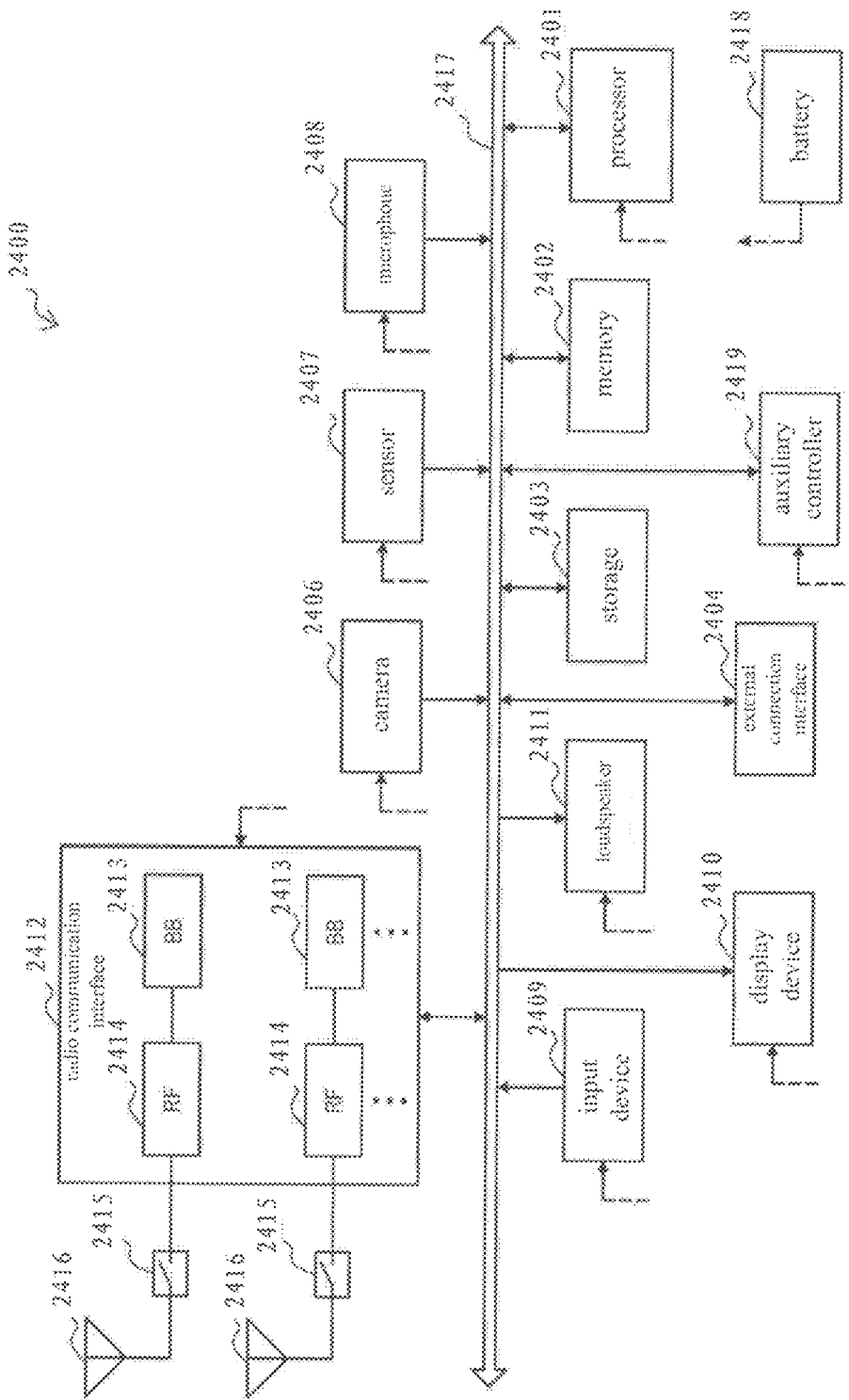
FIG. 24 shows a block diagram of an example of a schematic configuration of a smartphone to which the technology of the present disclosure may be applied.

FIG. 24 is a block diagram illustrating an example of a schematic configuration of a smartphone 2400 to which the technology of the present disclosure may be applied. The smartphone 2400 includes a processor 2401, a memory 2402, a storage 2403, an external connection interface 2404, a camera 2406, a sensor 2407, a microphone 2408, an input device 2409, a display device 2410, a loudspeaker 2411, a radio communication interface 2412, one or more antenna switches 2415, one or more antennas 2416, a bus 2417, a battery 2418 and an auxiliary controller 2419.

The processor 2401 may be, for example, a CPU or a system on a chip (SoC), and controls functions of an application layer and another layer of the smartphone 2400. The memory 2402 includes RAM and ROM, and stores a program that is executed by the processor 2401, and data. The storage 2403 may include a storage medium such as a semiconductor memory and a hard disk. The external connection interface 2404 is an interface for connecting an external device such as a memory card and a universal serial bus (USB) device to the smartphone 2400.

The camera 2406 includes an image sensor such as a charge coupled device (CCD) and a complementary metal oxide semiconductor (CMOS), and generates a captured image. The sensor 2407 may include a group of sensors such as a measurement sensor, a gyro sensor, a geomagnetic sensor, and an acceleration sensor. The microphone 2408 converts sounds that are input to the smartphone 2400 to audio signals. The input device 2409 includes, for example, a touch sensor configured to detect touch onto a screen of the display device 2410, a keypad, a keyboard, a button, or a switch, and receives an operation or information input from a user. The display device 2410 includes a screen such as a liquid crystal display (LCD) and an organic light-emitting diode (OLED) display, and displays an output image of the smartphone 2400. The speaker 2411 converts audio signals that are output from the smartphone 2400 to sounds.

The radio communication interface 2412 supports any cellular communication scheme such as LTE and LTE-Advanced, and performs radio communication. The radio communication interface 2412 may typically include, for example, a BB processor 2413 and an RF circuit 2414. The BB processor 2413 may perform, for example, encoding/decoding, modulating/demodulating, and multiplexing/demultiplexing, and performs various types of signal processing for radio communication. Meanwhile, the RF circuit 2414 may include, for example, a mixer, a filter, and an amplifier, and transmits and receives radio signals via the antenna 2416. The radio communication interface 2412 may be a one chip module having the BB processor 2413 and the RF circuit 2414 integrated thereon. The radio communication interface 2412 may include the multiple BB processors 2413 and the multiple RF circuits 2414, as illustrated in FIG. 24. Although FIG. 24 illustrates the example in which the radio communication interface 2412 includes the multiple BB processors 2413 and the multiple RF circuits 2414, the radio communication interface 2412 may also include a single BB processor 2413 or a single RF circuit 2414.

Furthermore, in addition to a cellular communication scheme, the radio communication interface 2412 may support another type of radio communication scheme such as a short-distance wireless communication scheme, a near field communication scheme, and a radio local area network (LAN) scheme. In that case, the radio communication interface 2412 may include the BB processor 2413 and the RF circuit 2414 for each radio communication scheme.

Each of the antenna switches 2415 switches connection destinations of the antennas 2416 among multiple circuits (such as circuits for different radio communication schemes) included in the radio communication interface 2412.

Each of the antennas 2416 includes a single or multiple antenna elements (such as multiple antenna elements included in an MIMO antenna), and is used for the radio communication interface 2412 to transmit and receive radio signals. The smartphone 2400 may include the multiple antennas 2416, as illustrated in FIG. 24. Although FIG. 24 illustrates the example in which the smartphone 2400 includes the multiple antennas 2416, the smartphone 2400 may also include a single antenna 2416.

Furthermore, the smartphone 2400 may include the antenna 2416 for each radio communication scheme. In that case, the antenna switches 2415 may be omitted from the configuration of the smartphone 2400.

The bus 2417 connects the processor 2401, the memory 2402, the storage 2403, the external connection interface 2404, the camera 2406, the sensor 2407, the microphone 2408, the input device 2409, the display device 2410, the speaker 2411, the radio communication interface 2412, and the auxiliary controller 2419 to each other. The battery 2418 supplies power to blocks of the smartphone 2400 illustrated in FIG. 24 via feeder lines, which are partially shown as dashed lines in the figure. The auxiliary controller 2419 operates a minimum necessary function of the smartphone 2400, for example, in a sleep mode.

In the smartphone 2400 illustrated in FIG. 24, the reference signal sending unit or the transceiving unit described by using FIG. 6 and FIG. 7 may be implemented by the radio communication interface 2412. At least a part of the functions of the device at the user equipment end described above may also be implemented by the processor 2401 or the auxiliary controller 2419.

Preferred embodiments of the present disclosure are described with reference to the drawings above, but the present disclosure is of course not limited to the above examples. Those skilled in the art may make various changes and modifications within the scope of the appended claims, and it should be understood that these changes and modifications naturally fall within the technical scope of the present disclosure.

For example, in the above embodiments, multiple functions included in one unit may be implemented by separated devices. Alternatively, in the above embodiments, multiple functions implemented by multiple units may be implemented by separated devices. In addition, one of the above functions may be implemented by multiple units. As a matter of course, such configuration is included in the technical scope of the present disclosure.

In the description, steps described in the flowcharts not only include processing performed in a time sequence according to the order described, but also include processing performed concurrently or separately but not necessarily chronically. In addition, even if in steps performed in the time sequence, as a matter of course, the order may be changed appropriately.

The invention claimed is:

1. A device for a first communication apparatus in a wireless communication system, the device comprising:
    circuitry, configured to
    receive a semi-static beamformed second signal from a second communication apparatus, the second signal is a periodical signal with a first transmission period, and feedback, based on the reception of the second signal, information as first channel information on a channel between the second communication apparatus and the first communication apparatus,
    measure, based on measurement configuration information for the first communication apparatus from the second communication apparatus, a first signal in a specific beam corresponding to the first channel information, the measurement configuration information including a measurement indication for the first signal, the first signal is a periodical signal with a second transmission period; and
    generate, based on the measurement of the first signal, feedback information as second channel information on the channel between the second communication apparatus and the first communication apparatus,
    wherein the first transmission period is longer than the second transmission period.

2. The device according to claim 1, wherein the second signal is beamformed with a wide range coverage and the first channel information reflects a coarse direction from the second communication apparatus to the first communication apparatus.

3. The device according to claim 2, wherein the second signal includes a wideband signal and circuitry is configured to measure a wideband channel based on the second signal and feed back wideband channel information.

4. The device according to claim 1, wherein the first signal includes a narrowband signal.

5. The device according to claim 4, wherein the circuitry is configured to estimate a narrowband channel based on the first signal in the specific beam and feed back narrowband channel information.

6. The device according to claim 5, wherein the first signal is a CSI-RS (Channel Status Indicator-Reference Signal) and the second channel information includes at least one of CQI(Channel Quality Indicator), PMI(Precoding Matrix Indicator) or RI(Rank Indicator).

7. The device according to claim 1, wherein the second signal is beamformed in a vertical direction and the first channel information reflects the vertical direction from the second communication apparatus to the first communication apparatus.

8. The device according to claim 1, wherein the circuitry is configured to receive a data signal which is precoded based on the second channel information from the second communication apparatus.

9. The device according to claim 1, further comprises a plurality of Radio Frequency circuits and a plurality of antennas for receiving the first signal and the second signal, wherein the first communication apparatus is a user equipment and the device is implemented as the user equipment.

10. The device according to claim 1, wherein the second channel information, but not the first channel information, is for the second communication apparatus to schedule resources.

11. A method of operating a wireless communication system including a first communication apparatus, the method comprising:
receiving a semi-static beamformed second signal from a second communication apparatus, the second signal is a periodical signal with a first transmission period, and feeding back, based on the reception of the second signal, information as first channel information on a channel between the second communication apparatus and the first communication apparatus;
measuring, based on measurement configuration information for the first communication apparatus from the second communication apparatus, a first signal in a specific beam corresponding to the first channel information, the measurement configuration information including a measurement indication for the first signal, the first signal is a periodical signal with a second transmission period; and
generating, based on the first signal, feedback information as second channel information on the channel between the second communication apparatus and the first communication apparatus,
wherein the first transmission period is longer than the second transmission period.

12. A device for a second communication apparatus in a wireless communication system, the device comprising:
circuitry, configured to
transmit a semi-static beamformed second signal, which is a periodical signal with a first transmission period, to a first communication apparatus, and receive, from the first communication apparatus based on the measurement of the second signal, feedback information of first channel information on a channel between the second communication apparatus and the first communication apparatus,
provide, to the first communication apparatus, measurement configuration information including a measurement indication for a first signal, the first signal is a periodical signal with a second transmission period;
transmit the first signal in a specific beam corresponding to the first channel information to the first communication apparatus, and
receive, from the first communication apparatus based on the measurement of the first signal, feedback information of second channel information on the channel between the second communication apparatus and the first communication apparatus,
wherein the first transmission period is longer than the second transmission period.

13. The device according to claim 12, wherein the circuitry is configured to beamform the second signal with a wide range coverage and acquire a coarse direction from the second communication apparatus to the first communication apparatus based on the first channel information.

14. The device according to claim 13, wherein the circuitry is configured to transmit the second signal in wideband resources and acquire wideband channel information based on the first channel information.

15. The device according to claim 12, wherein the circuitry is configured to transmit the first signal in narrow band resources.

16. The device according to claim 15, wherein the circuitry is configured to acquire narrowband channel information based on the second channel information from the first communication apparatus.

17. The device according to claim 16, wherein the circuitry is configured to transmit a CSI-RS as the first signal and acquire at least one of CQI(Channel Quality Indicator), PMI(Precoding Matrix Indicator) or RI(Rank Indicator) from the second channel information.

18. The device according to claim 12, wherein the circuitry is configured to beamform the second signal in a vertical direction from the second communication apparatus to the first communication apparatus and acquire the vertical direction information based on the first channel information.

19. The device according to claim 12, wherein the circuitry is configured to precode a data signal based on the second channel information and transmit the data signal to the first communication apparatus.

20. The device according to claim 12, further comprises a plurality of Radio Frequency circuits and a plurality of antennas for transmitting the first signal and the second signal, wherein the second communication apparatus is a base station and the device is implemented as the base station.

21. The device according to claim 12, wherein the second channel information, but not the first channel information, is for the second communication apparatus to schedule resources.

22. A method for a second communication apparatus in a wireless communication system, the method comprising:
transmitting a semi-static beamformed second signal, which is a periodical signal with a first transmission period, to a first communication apparatus, and receive, from the first communication apparatus based on the reception of the second signal, feedback information of first channel information on a channel between the second communication apparatus and the first communication apparatus;
providing, to the first communication apparatus, measurement configuration information including a measurement indication for a first signal, the first signal is a periodical signal with a second transmission period;
transmitting the first signal in a specific beam corresponding to the first channel information to the first communication apparatus, and
receiving, from the first communication apparatus based on the measurement of the first signal, feedback information of second channel information on the channel between the second communication apparatus and the first communication apparatus, wherein the first transmission period is longer than the second transmission period.

* * * * *